(12) United States Patent
Radhakrishnan

(10) Patent No.: US 11,290,394 B2
(45) Date of Patent: Mar. 29, 2022

(54) TRAFFIC CONTROL IN HYBRID NETWORKS CONTAINING BOTH SOFTWARE DEFINED NETWORKING DOMAINS AND NON-SDN IP DOMAINS

(71) Applicant: DELL PRODUCTS L.P., Round Rock, TX (US)

(72) Inventor: Muthulakshmi Radhakrishnan, Chennai (IN)

(73) Assignee: Dell Products L.P., Round Rock, TX (US)

(*) Notice: Subject to any disclaimer, the term of this patent is extended or adjusted under 35 U.S.C. 154(b) by 69 days.

(21) Appl. No.: 16/600,335

(22) Filed: Oct. 11, 2019

(65) Prior Publication Data

US 2021/0112020 A1    Apr. 15, 2021

(51) Int. Cl.
| | |
|---|---|
| *H04L 12/931* | (2013.01) |
| *H04L 49/201* | (2022.01) |
| *H04L 49/253* | (2022.01) |
| *H04L 49/1515* | (2022.01) |
| *H04L 45/64* | (2022.01) |
| *H04L 12/18* | (2006.01) |
| *H04L 12/66* | (2006.01) |
| *H04L 49/00* | (2022.01) |

(52) U.S. Cl.
CPC ........ *H04L 49/201* (2013.01); *H04L 12/1886* (2013.01); *H04L 12/66* (2013.01); *H04L 45/64* (2013.01); *H04L 49/1515* (2013.01); *H04L 49/254* (2013.01); *H04L 49/3009* (2013.01)

(58) Field of Classification Search
CPC ..... H04L 49/201; H04L 49/254; H04L 45/64; H04L 12/1886; H04L 49/1515; H04L 12/66; H04L 49/3009
See application file for complete search history.

(56) References Cited

U.S. PATENT DOCUMENTS

| | | |
|---|---|---|
| 8,170,040 B2 | 5/2012 | Konda |
| 9,210,071 B2 | 12/2015 | Allan et al. |
| 9,210,072 B2 | 12/2015 | Mahadevan et al. |
| 9,276,877 B1 | 3/2016 | Chua et al. |
| 9,300,483 B2 | 3/2016 | Banavalikar et al. |
| 9,450,817 B1* | 9/2016 | Bahadur ............. H04L 41/0806 |
| 9,843,504 B2 | 12/2017 | Han et al. |
| 2013/0322443 A1* | 12/2013 | Dunbar ................ H04L 12/185 |
| | | 370/390 |
| 2014/0192645 A1* | 7/2014 | Zhang .................. H04L 47/726 |
| | | 370/235 |
| 2014/0254591 A1 | 9/2014 | Mahadevan |
| 2015/0049631 A1* | 2/2015 | Heron .................... H04L 45/64 |
| | | 370/254 |
| 2015/0103844 A1* | 4/2015 | Zhao ..................... H04L 45/50 |
| | | 370/410 |

(Continued)

OTHER PUBLICATIONS

Allan et al., "A Framework for Computed Multicast Applied to SR-MPLS", PIM Working Group, Jun. 2018.

(Continued)

*Primary Examiner* — Dady Chery
(74) *Attorney, Agent, or Firm* — Joseph Mencher

(57) ABSTRACT

A Software Defined Networking (SDN) controller controls multicast traffic in an SDN domain and one or more non-SDN domains imbedded in the SDN domain.

19 Claims, 18 Drawing Sheets

(56) References Cited

U.S. PATENT DOCUMENTS

| | | | |
|---|---|---|---|
| 2015/0117451 A1* | 4/2015 | Kaneriya | H04L 45/38 370/392 |
| 2017/0005910 A1* | 1/2017 | K Sebastian | H04L 12/64 |
| 2017/0237655 A1* | 8/2017 | Yang | H04L 61/103 370/254 |
| 2018/0097645 A1 | 4/2018 | Rajagopalan | |
| 2018/0375799 A1* | 12/2018 | Liu | H04L 12/1886 |
| 2020/0389378 A1* | 12/2020 | Shahbaz | H04L 12/1886 |

OTHER PUBLICATIONS

Cheng, "Extended Dijkstra algorithm and Moore-Bellman-Ford algorithm", 2017, arXiv:1708.04541v1. https://arxiv.org/abs/1708.04541.

Eddy, "ONOS Multicast Forwarding Architecture," Jun. 2015. https://wiki.onosproject.org/display/ONOS/ONOS+Multicast+Forwarding+Architecture.

Ren et al., "Traffic Engineering and Manageability for Multicast Traffic in Hybrid SDN", KSII Transactions on Internet and Information Systems, KSII, Jun. 2018, vol. 12(6).

RFC 2328, "OSPF Version 2", Network Working Group, Apr. 1998. https://tools.ietf.org/html/rfc2328.

RFC 3031 "Multiprotocol Label Switching Architecture", Network Working Group, Jan. 2001.

RFC 6754 "Protocol Independent Multicast Equal-Cost Multipath (ECMP) Redirect", Internet Engineering Task Force (IETF), Oct. 2012.

RFC 7761, "Protocol Independent Multicast—Sparse Mode (PIM-SM): Protocol Specification (Revised)", Internet Engineering Task Force (IETF), Mar. 2016.

RFC 8279, "Multicast Using Bit Index Explicit Replication (BIER)", Internet Engineering Task Force (IETF), Nov. 2017.

RFC 8402, "Segment Routing Architecture", Internet Engineering Task Force (IETF), Jul. 2018.

Salsano et. al., "Hybrid IP/SDN networking: open implementation and experiment management tools", IEEE Transaction of Network and Service Management, Dec. 2015, vol. 13(1). http://dx.doi.org/10.1109/TNSM.2015.2507622.

Shen et al., "Discovering PIM-SM Next-Nexthop Downstream Nodes", Network Working Group, Jul. 2004.

Wei et al., "Bandwidth Aware Multicast Load Balancing", Cisco Systems, Apr. 2013.

U.S. Appl. No. 16/556,045, "Multicast Transmissions Management", filed Aug. 29, 2019.

Xylomenos et al., "IPTV Over ICN", Proceedings of the Packet Video Workshop 2018.

Zhang et al., "Multicast in SR Networks", PIM, Aug. 2018.

Cai, et al., "RFC 6754—Protocol Independent Multicast Equal-Cost Multipath (ECMP) Redirect," Internet Engineering Task Force, 2012, pp. 1-2. http://www.rfc-editor.org/info/rfc6754.

Fenner, et al., "RFC 7761—Protocol Independent Multicast—Sparse Mode (PIM-SM) : Protocol Specification (Revised)," 2016, pp. 1-137. http://www.rfc-editor.org/info/rfc7761.

Moy, "RFC 2328—OSPF Version 2," The Internet Society, 1998, pp. 1-244. https://tools.ietf.org/html/rfc2328.

Wijnands, et al., "RFC 8279—Multicast Using Bit Index Explicit Replication (BIER)," 2017, pp. 1-43. https://www.rfc-editor.org/info/rfc8279.

* cited by examiner

TRAFFIC CONTROL IN HYBRID NETWORKS CONTAINING BOTH SOFTWARE DEFINED NETWORKING DOMAINS AND NON-SDN IP DOMAINS

BACKGROUND

The present disclosure relates to multicast traffic management in hybrid computer networks that include Software Defined Networking domains (SDN domains) and non-SDN domains.

SDN is a networking paradigm that centralizes the control of network routers, allowing a central controller to configure the network traffic flows beyond the capabilities of a typical Interior Gateway Protocol (IGP). A typical IGP, like RIP or OSPF, configures the network to steer network traffic along the shortest paths, minimizing the number of hops or the path's cost. But it may be desirable to use longer paths in order to load-balance the traffic, or take into account desired traffic flow parameters (like Quality of Service (QoS)), or bypass congested areas or failures, or address security or other concerns. Such flexible network configuration can be easier to provide in SDN. However, replacing existing networks by SDN-capable devices and protocols is an expensive undertaking, fraught with potential errors due to limited experience with SDN in the field. Therefore, gradual SDN deployment is desirable. The gradual deployment involves creating hybrid networks including both SDN and non-SDN domains. See for example Stefano Salsano et. al., "Hybrid IP/SDN networking: open implementation and experiment management tools" (2015), IEEE Transaction of Network and Service Management, accepted for publication on December 2015, published in Volume 13, Issue 1, March 2016, incorporated herein by reference, available at http://dx.doi.org/10.1109/TNSM.2015.2507622; Cheng Ren et al., "Traffic Engineering and Manageability for Multicast Traffic in Hybrid SDN", KSII TRANSACTIONS ON INTERNET AND INFORMATION SYSTEMS, KSII, VOL. 12, NO. 6, June 2018, incorporated herein by reference; "ONOS Multicast Forwarding Architecture", at https://wiki.onosproject.org/display/ONOS/ONOS+Multicast+Forwarding+Architecture, created by Rusty Eddy, last modified on Jun. 9, 2015, incorporated herein by reference.

FIG. 1A illustrates a non-SDN IP (Internet Protocol) network domain 104. Domain 104 can be an autonomous system or some other domain. Routers 110 (marked R0, R1, etc.) transfer data between other network nodes 114 (H1, H2, . . . ). Nodes 114 can be end stations, or can be routers or networks outside of domain 104. Nodes 110, 114 are interconnected by links 112. Each link 112 is a physical or virtual layer-2 network (LAN). Some or all routers 110 may be enabled to carry multicast traffic.

Network domain 104 may provide multipaths, i.e. multiple paths between a given pair of nodes. For example, the following paths are provided between the nodes H2 and H3: a path through routers R6, R4, R1; a path through R6, R5, R1; and other paths. In particular, multiple paths can be provided between multicast-enabled routers one of which is upstream of the other in multicast traffic flow. Multiple paths improve network reliability because if one path fails (due for example to a link failure, or a router failure, or network reconfiguration by an administrator), other paths may be available. Also, multiple paths can carry more traffic between the same pair of nodes (e.g. H2 and H3) than a single path. However, management of multiple paths increases utilization of computer resources such as bandwidth, memory space, and processor time, and increases network delays, cost, and complexity. Hence, there is a need to improve multipath management, especially if such improvement can be realized with minimal changes to existing network technologies.

FIG. 1B illustrates an exemplary non-SDN router 110 that forwards a packet 120, possibly a multicast packet, in an IP network. The router includes a data plane 110D and a control plane 110C, each of which has one or more computer processors 130 (130D or 130C respectively) executing computer instructions stored in respective memory 134 (134D or 134C). Each memory 134 also stores a respective routing table 138 (138D or 138C), which includes a Multicast Router Information Base 139 (MRIB 139D or 139C). Data plane 110D includes ports P0, P1, . . . Pn (n is a positive integer) connected to links 112. The ports are used to implement the router's interfaces.

IP packet 120 has an IP header with an IP destination address 120.DA, an IP source address 120.SA, and other fields. The packet also has a payload 120.P. When the packet arrives, its destination address 120.DA and possibly other fields are matched against the data plane's routing table 138D to obtain the outgoing interface(s) for forwarding the packet. The packet is then forwarded by the data plane on such interfaces. This packet forwarding does not involve control plane 110C, and is typically fast to maximize the router's throughput and minimize delays. To that end, the data plane typically has only minimal software programmability, and minimal flexibility in defining the data plane operation.

Control plane 110C is typically more programmable and flexible, to perform router management. Control plane 110C executes a routing protocol (OSPF for example) by communicating, through data plane 110D, with other routers 110 to obtain network topology database (DB) 140 used to build the routing table 138C. Network topology DB 140 may also include information entered by a network administrator (a human). Control plane 110C creates the data plane's routing table 138D and provides it to the data plane. (The data plane's routing table 138D may or may not be identical to table 138C, and may or may not be optimized for each port Pi (i.e. P0, . . . Pn), or for each interface, or for a group of ports or interfaces. Thus, a separate routing table 138D may be provided for each port or interface or group of ports or interfaces.)

In SDN, many functions of control planes 110C are moved to a separate computer system 210 (FIG. 2), called SDN controller. The SDN controller performs network discovery, and sends requests to routers 110 to instruct the routers on setting up their routing tables 138D. In particular, based on the discovery, SDN controller 210 maps out paths between nodes for any given network flow, and causes the routers 110 to set their tables 138D accordingly, taking into account congestion messages or other reports received from the routers, or desired load-balancing, or desired traffic flow parameters (like QoS), or to bypass congested areas or failures, or address security or other concerns.

It is desirable to provide new hybrid technology for gradual deployment of SDN.

SUMMARY

This section summarizes some features of the present disclosure. Other features are defined in subsequent sections. The invention is defined by the appended claims.

Some embodiments of the present disclosure provide hybrid technology for managing multicast traffic that traverses SDN and non-SDN capable network domains. In some embodiments, an SDN controller controls the multicast paths "end-to-end", including the paths through non-SDN domains. In some embodiments, the non-SDN domains are enhanced to enable the SDN controller to learn the non-SDN network topology and multicast distribution path topology. The SDN controller monitors the non-SDN traffic, and configures the multicast paths as needed.

Other features are within the scope of the invention, as defined by the appended claims.

DETAILED DESCRIPTION

Figure 1A:
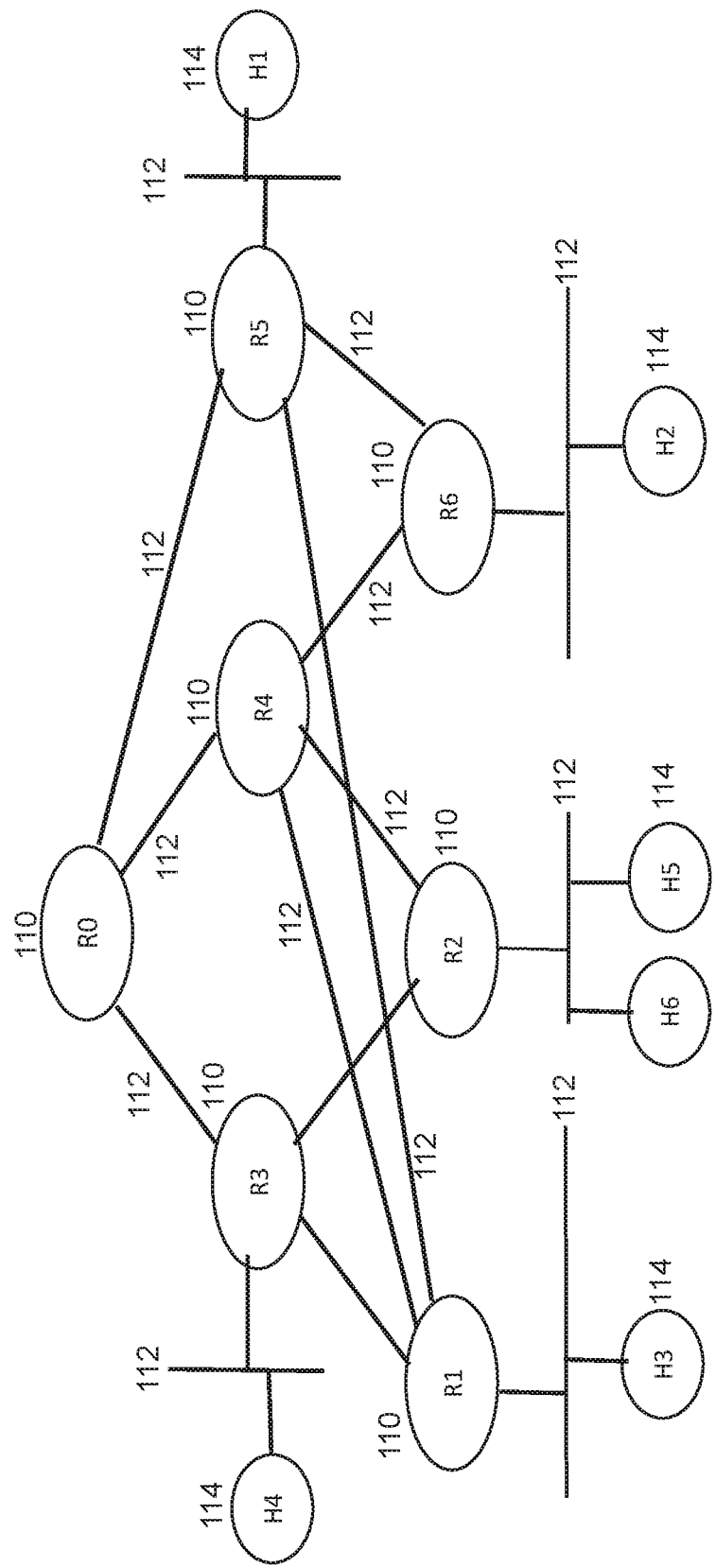
FIG. 1A is a schematic view illustrating a network embodiment.

For purposes of this disclosure, a router or other network node may include any computer system, including for example a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. A network node may include random access memory (RAM), one or more processing resources such as a central processing unit (CPU) or hardware or software control logic, ROM, and/or other types of nonvolatile memory. Additional components may include one or more disk drives, one or more ports for communicating with external devices as well as various input and output (I/O) devices, such as a keyboard, a mouse, touchscreen and/or a video display. The network node may also include one or more buses operable to transmit communications between the various hardware components.

As used herein, the term "memory" can denote any type of computer storage, including semiconductor, magnetic, or optical types.

First, multicast enhancement will be described for non-SDN domains. (See also U.S. patent application Ser. No. 16/556,045, filed on Aug. 29, 2019, having the same applicant and inventor as the present application, and incorporated herein by reference.) Then hybrid SDN description will follow.

Multicast Enhancements Suitable for Non-SDN Networks

In some multicast protocols, the routing tables 138 (and 139) store only minimal information required to forward a packet to the next hop or hops (in case of multicast). Table 1 below illustrates a multicast entry in MRIB 139 for Sparse-Mode Protocol Independent Multicast (PIM-SM), described in RFC 7761 (Internet Engineering Task Force (IETF), March 2016), incorporated herein by reference. See also U.S. Pat. No. 9,210,072 (applicant: Dell Products L.P.), issued Dec. 8, 2015, incorporated herein by reference. The MRIB entry, in the last row of Table 1, is for an (S,G) state, to forward multicast traffic from a source S to a group G of traffic receivers. For example, the source S can be H2, and the group G may consist of H3 and H4. The source S has an IP address of 171.5.6.7. The group G has a group IP address of 224.1.2.3. The entry of Table 1 can be stored on a router 110, e.g. on R4. Based on this entry, if a packet 120 has the destination address 120.DA of 224.1.2.3, and the source address 120.SA of 171.5.6.7; and the packet arrived on the router's interface P13; then the router will transmit the packet on the routers interfaces P2 and P4. (In Table 1, "iif" stands for "incoming interface", and "OIF" stands for "outgoing interface").

TABLE 1

| MRIB ENTRY | | | |
| --- | --- | --- | --- |
| Multicast DA | Source Address | iif | OIF list |
| 224.1.2.3 | 171.5.6.7 | P13 | P2, P4 |

The MRIB entry may include additional information, e.g. layer-2 encapsulation information for each outgoing interface.

The MRIB entries are created, deleted, or modified when nodes 114 join or leave multicast groups, or when changes in the network topology require reconfiguration of the multicast distribution paths. The MRIB entries define one or more multicast distribution trees each of which defines distribution paths from a root router (e.g. R6 or R0) to the leaf routers (e.g. routers R1 and R3 for nodes H3 and H4).

Figure 3:
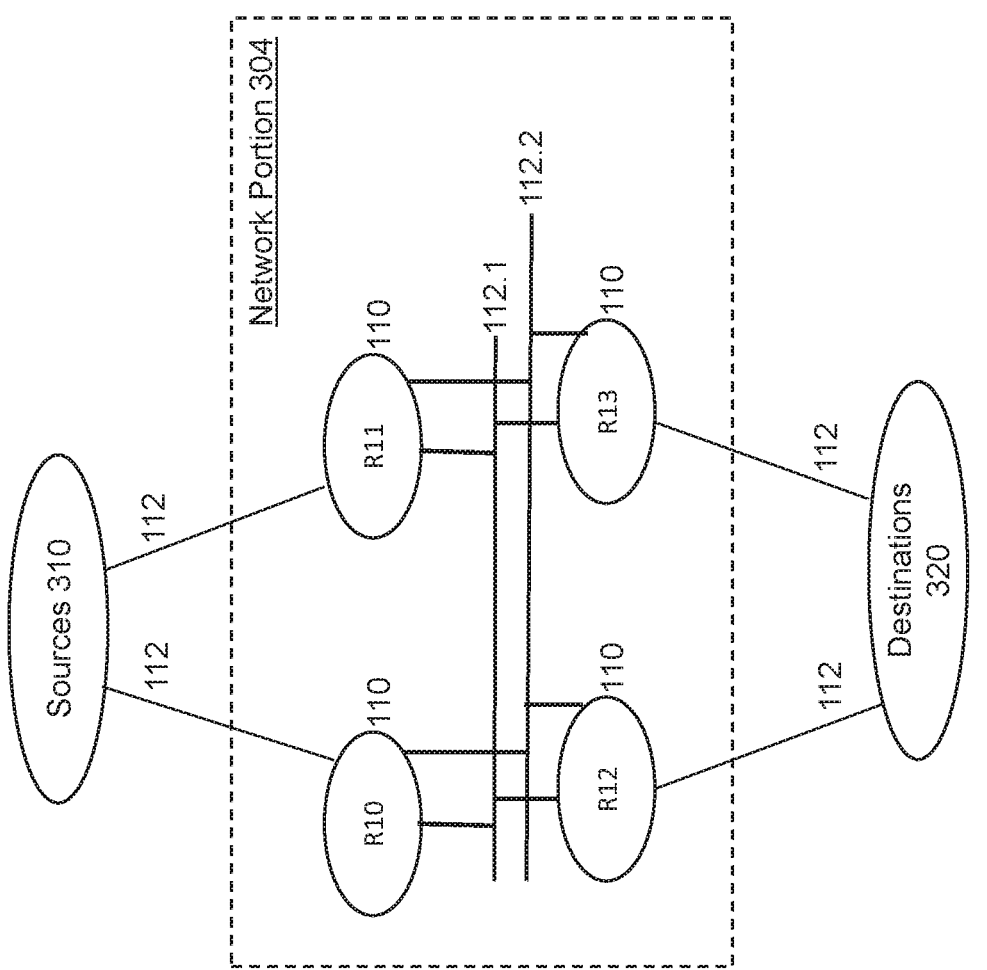
FIG. 3 is a schematic view illustrating a network embodiment.

If a network has multiple paths between a pair of routers, then a multicast distribution tree can be reconfigured to relieve a congested path by load-balancing the traffic over multiple paths, or to bypass a failed or congested link or router. This can be done, for example, via a protocol called ECMP Redirect in PIM-SM; see RFC 6754 (Internet Engineering Task Force (IETF), October 2012), incorporated herein by reference. See also Liming Wei, Vincent Ng (Cisco Systems), "Bandwidth Aware Multicast Load Balancing", April 2013, incorporated herein by reference. ECMP Redirect can be applied to a network portion including multiple, equal-cost links 112. FIG. 3 shows a network portion 304 with two such links, 112.1 and 112.2. Each of these links interconnects a given set of two or more routers 110. In the example of FIG. 3, there are four such routers, marked R10-R13. Routers R10 and R11 are connected, by other links 112, to sources 310, which include nodes 114 sending multicast traffic, and may include other routers 110 between the source nodes 114 and the network portion 304. Routers R12 and R13 are connected to destinations 320, which include nodes 114 receiving multicast traffic, and may include other routers 110 between the receiver nodes 114 and the network portion 304. A multicast path from a source 310 to a destination 320 may pass through any one of routers R10 and R11, any one of links 112.1 and 112.2, and any one of routers R12 and R13. These 8 available paths may be configured and reconfigured to improve load balancing or to bypass congested or failed links or routers in network portion 304. For example, different traffic flows can be directed through respective different ones of the 8 paths to load-balance the traffic. If one or more of the 8 paths fail, the other paths are available. Further, the routers R10, R11 can detect duplicate flows on different paths, and can eliminate the unnecessary flow(s).

ECMP Redirect has only local scope in the sense that it is limited to network portions of neighbor routers: R10-R13 are neighbors of each other. ECMP Redirect is not extended to larger network portions due to limitations of multicast and unicast routing protocols. Specifically, to accomplish ECMP Redirect, each of the four routers R10 through R13 uses the multicast and unicast routing protocols to obtain information on its neighbors. But the routers lack multicast-related information on other, non-neighbor routers to provide effective path management over larger network portions. A limited solution is described in Naiming Shen et al., "Discovering PIM-SM Next-Nexthop Downstream Nodes", Network Working Group, Internet Draft, July 2004. This solution allows a router to discover a downstream non-neighbor router two hops away on a multicast path. However, these techniques do not reach a router more than two hops away.

Some embodiments of the present disclosure provide multicast transmission management techniques not limited to any number of hops between routers. In some embodiments, an entire multicast distribution tree is monitored at the tree's root router. The root router can request other routers to change the tree topology as needed for load-balancing, or to bypass congested or failed areas, or eliminate unnecessary traffic duplication.

In some embodiments, a path from a source of multicast traffic to the multicast receivers is monitored at the first hop router (FHR). The FHR can request other routers in the path to change the path topology as needed for load-balancing, or to bypass congested or failed areas, or eliminate unnecessary traffic duplication.

Some embodiments can be implemented with minimal changes to existing technology. For example, in some embodiments, no changes are needed to the routers' data planes 110D.

Figure 4:
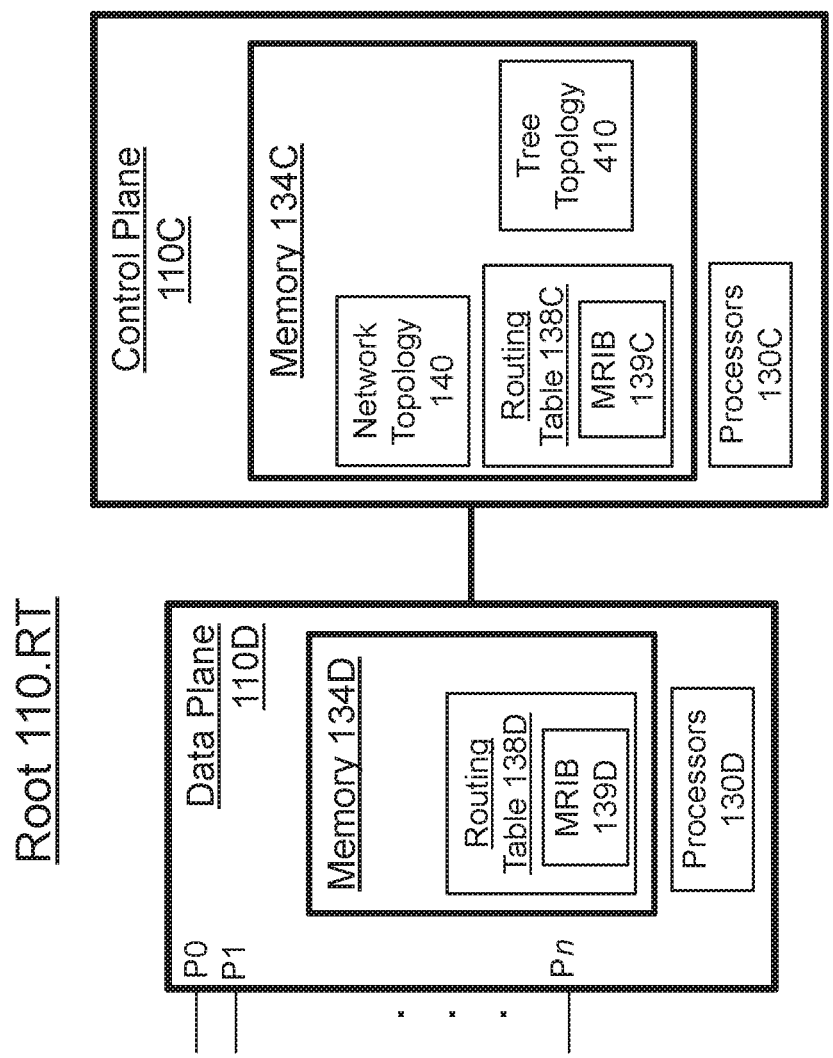
FIG. 4 is a schematic view illustrating a router embodiment.

FIG. 4 is a block diagram of an exemplary router 110.RT configured as a root of a multicast distribution tree, e.g. a shared tree (Rendezvous Point (RP) tree, i.e. RPT) or a shortest-path tree (SPT). For example, in the network domain of FIG. 1A, if a group G includes nodes H2 and H3 receiving traffic from H4 on the RPT rooted at R0, then R0 can be configured as in FIG. 4. If H2 and/or H3 receive traffic from H4 on the SPT, then router R3 can be configured as in FIG. 4 if R3 is H4's First Hop Router (FHR) and hence is the SPT root. A network domain may include many trees and hence many root routers 110.RT. All or some of the root routers may be configured as in FIG. 4. Other root or non-root routers may be as in FIG. 1B or of some other type.

In some embodiments, root and non-root routers 110 have the same hardware, and the root configuration is defined by software (not shown) stored in memory 134C. These details are exemplary and not limiting.

Figure 1B:
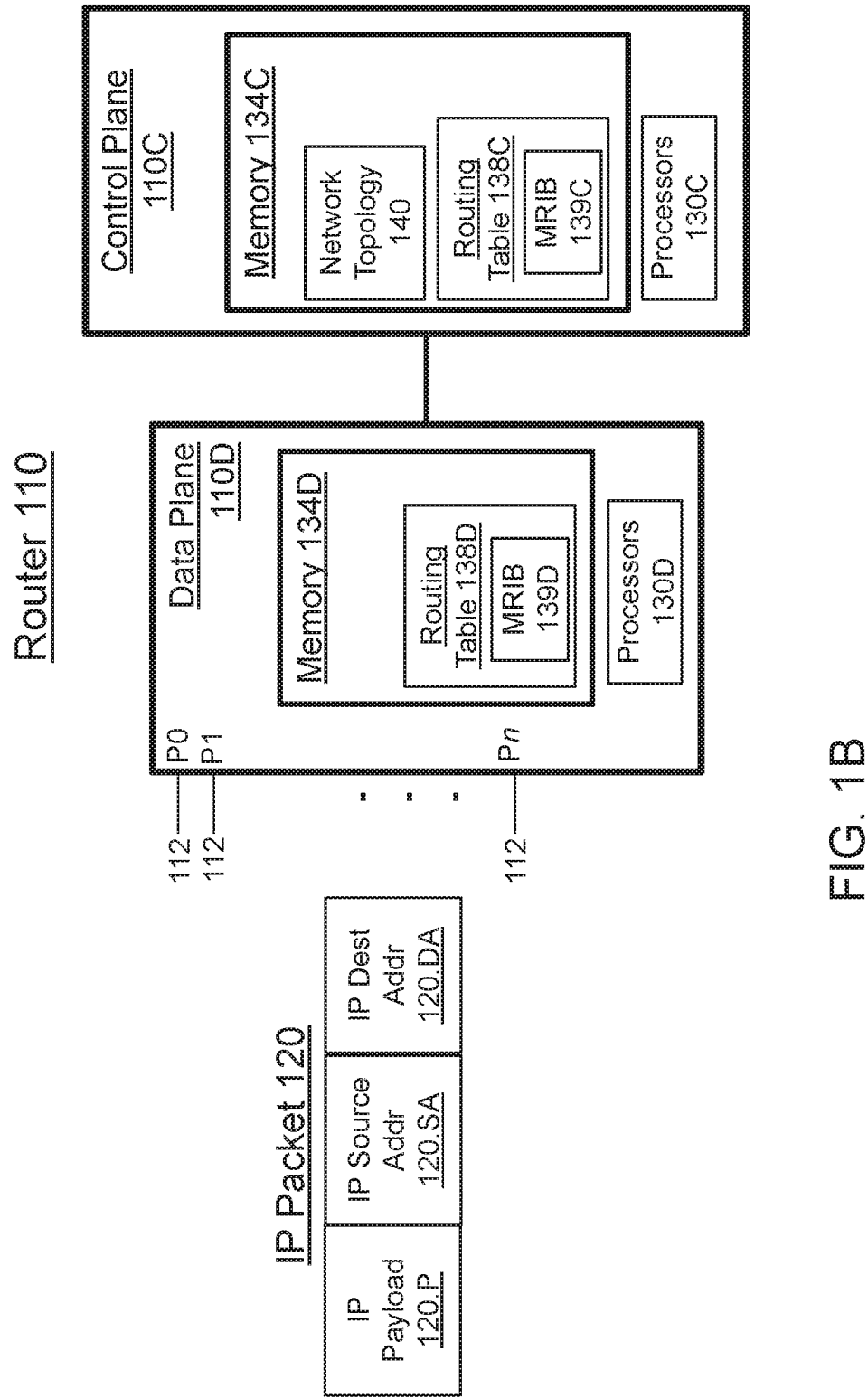
FIG. 1B is a schematic view illustrating a router embodiment.
Figure 2:
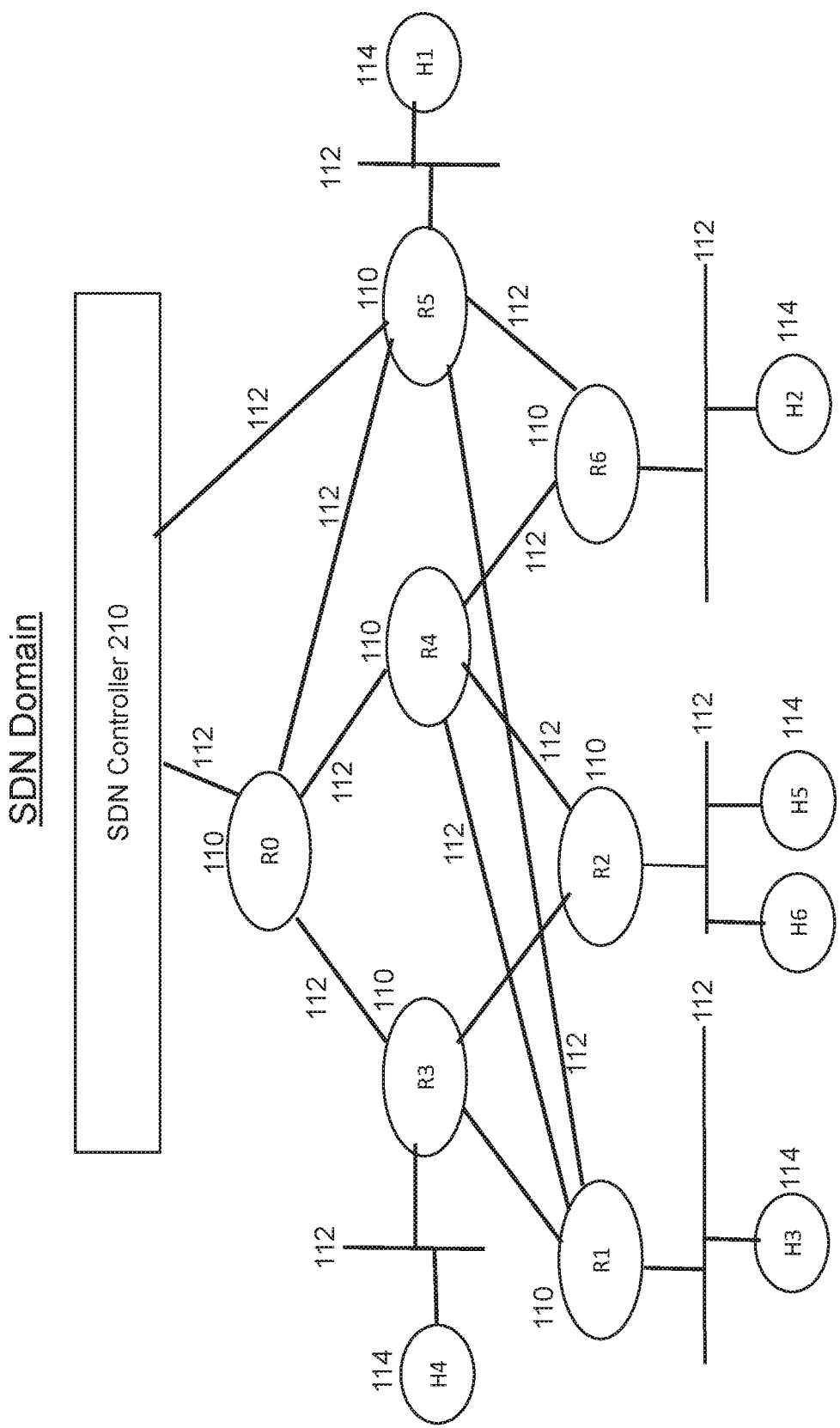
FIG. 2 is a schematic view illustrating a network embodiment.

Data plane 110D of router 110.RT mayor may not be as in FIG. 1B.

Control plane 110C of router 110.RT includes, in addition to the items shown in FIG. 1B, a database 410 describing the topology of the corresponding tree. In particular, DB 410 identifies all the routers in the tree and describes which of the routers are directly interconnected. In some embodiments, a group of routers can be interconnected by multiple links (as in FIG. 3 for example), and DB 410 may identify each link and, for each link, the routers and/or router interfaces connected to the link.

Figure 5:
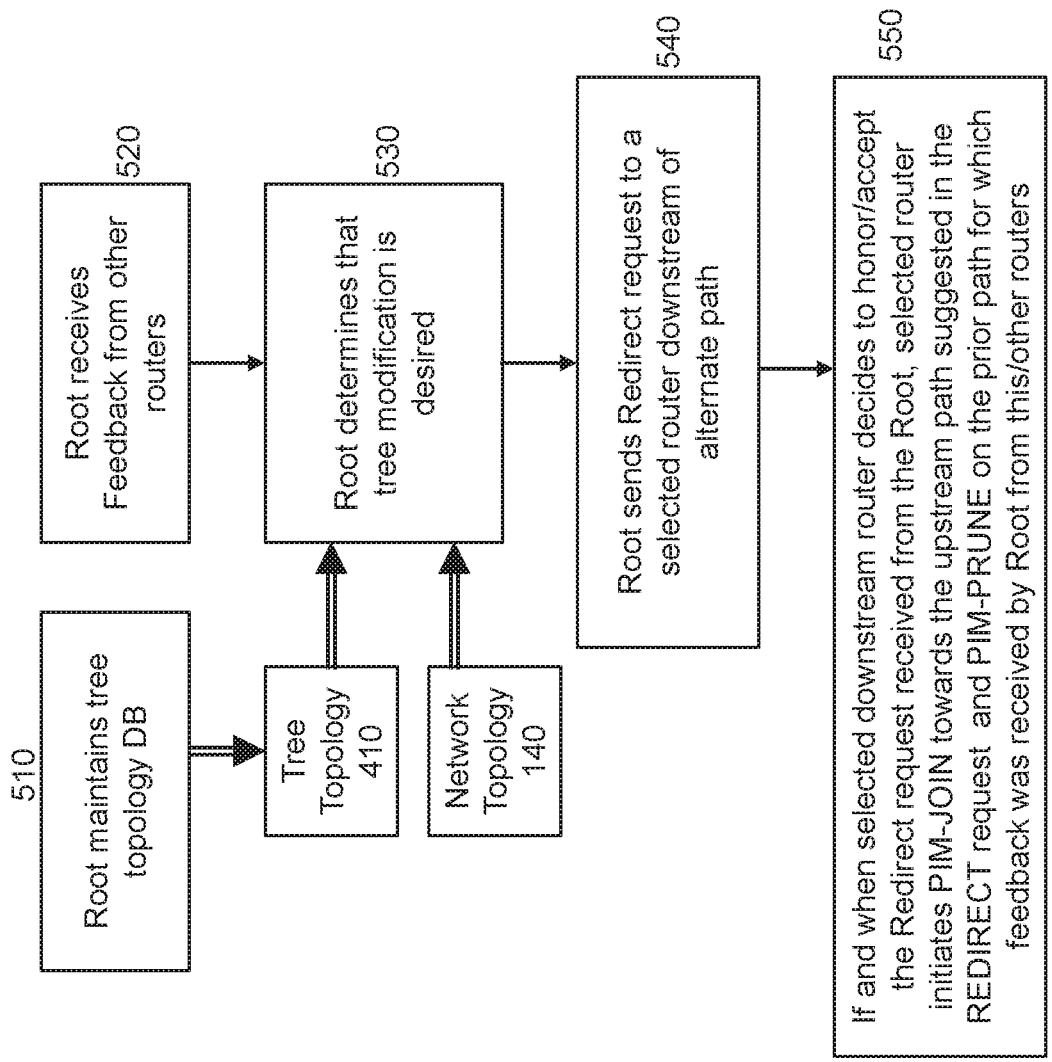
FIG. 5 is a flow chart illustrating an embodiment of a network management method.

Root router 110.RT can participate in network management as shown in FIG. 5. In block 510, root 110.RT builds and maintains tree topology DB 410. The root also maintains network topology DB 140 based on the IGP (e.g. OSPF), possibly using known techniques.

The root receives, in block 520, feedback messages from other routers 110 regarding possible congestion or failures.

Based on this feedback (block 530) and/or on the root's own measurements on the links directly connected to the root, and based on tree topology DB 410 and network topology DB 140, the root 110.RT may determine that a tree portion is congested or has failed, and the tree should be modified. This determination can be made using the same criteria as in ECMP Redirect, or in some other way. For example, in FIG. 6, root 110.RT is R0, which may be the RP for a group G of nodes H2 and H5. The RPT includes the following (*,G) paths: R0-R4-R6 to H2, and R0-R4-R2 to H5. Router R4 or R6 has detected congestion or failure on the link R4-R6, and sent a suitable feedback message to root R0 (block 520). Based this feedback, and possibly feedback from other routers, the root R0 determines, in block 530, that the traffic to R6 should be re-directed to an alternate path R0-R5-R6. For example, the root R0 can determine the alternate path R0-R5-R6 as the shortest (i.e. lowest cost) alternate path, by invoking an IGP process to examine the unicast routing table or other IGP data. In some embodiments, the shortest path is determined by executing the extended Dijkstra algorithm described in Cong-Dian Cheng, "Extended Dijkstra algorithm and Moore-Bellman-Ford algorithm", arXiv:1708.04541v1 [math.OC], 2017, available at https://arxiv.org/abs/1708.04541, incorporated herein by reference. For example, in some embodiments using OSPF, the root R0 stores, in its network topology DB 140, the OSPF link state advertisements (LSAs); see RFC 2328, "OSPF Version 2", Network Working Group, April 1998, available at https://tools.ietf.org/html/rfc2328, incorporated herein by reference. Root R0 runs the extended Dijkstra algorithm on a network topology obtained from DB 140 by removing the LSAs on link R4-R6. Before running the algorithm, root R0 may also remove, from DB 140, other LSAs known to the root as corresponding to congested or failed links or routers as indicated by feedback received in block 520 and/or by R0's own measurements on the links R0-R4, R0-R3, R0-R5.

The root 110.RT may determine the alternate path based on other factors in addition to, or instead of, the cost. For example, available alternate paths may be limited to a selected set of paths or links or routers. Such limitations may be implemented by an administrator or automatically, and may be necessitated by a service level agreement (SLA), and/or a desired Quality of Service (QoS), and/or security considerations (e.g. a need to set aside network resources for security-related traffic, or not to allow some traffic at security-sensitive links or routers), or by other means.

If the root decides, in block 530, that the tree should be modified to shift at least some of the traffic to an alternate path (e.g. R0-R5-R6), the root proceeds to form the alternate path; see block 540. For example, in some multicast protocols including PIM-SM, multicast paths are formed by Join messages sent by downstream routers (e.g. R6) toward the root (e.g. R0). In such embodiments, in block 540, root 110.RT sends a Redirect request (which is possibly a unicast message) to a router (e.g. R6) downstream of the failed or congested link or router (downstream of the link R4-R6 in FIG. 6). If multiple routers report congestion or failure in the same path, then the Redirect request may be sent to a router downstream of all the congested or failed links or routers.

In some embodiments, the Redirect request completely or partially specifies the alternate path (e.g. the path R0-R5-R6). Examples of Redirect requests are provided below.

In block 550, a downstream router (e.g. R6) receives the Redirect request, and determines whether to arrange for the alternate path. In some embodiments, the Redirect request may or may not be ignored by the downstream router based, for example, on the factors described above in connection with block 530 and other factors (SLA, QoS, security, static configuration by administrator, etc.). In other embodiments, the downstream router is configured to always automatically perform the Redirect request.

Figure 6:
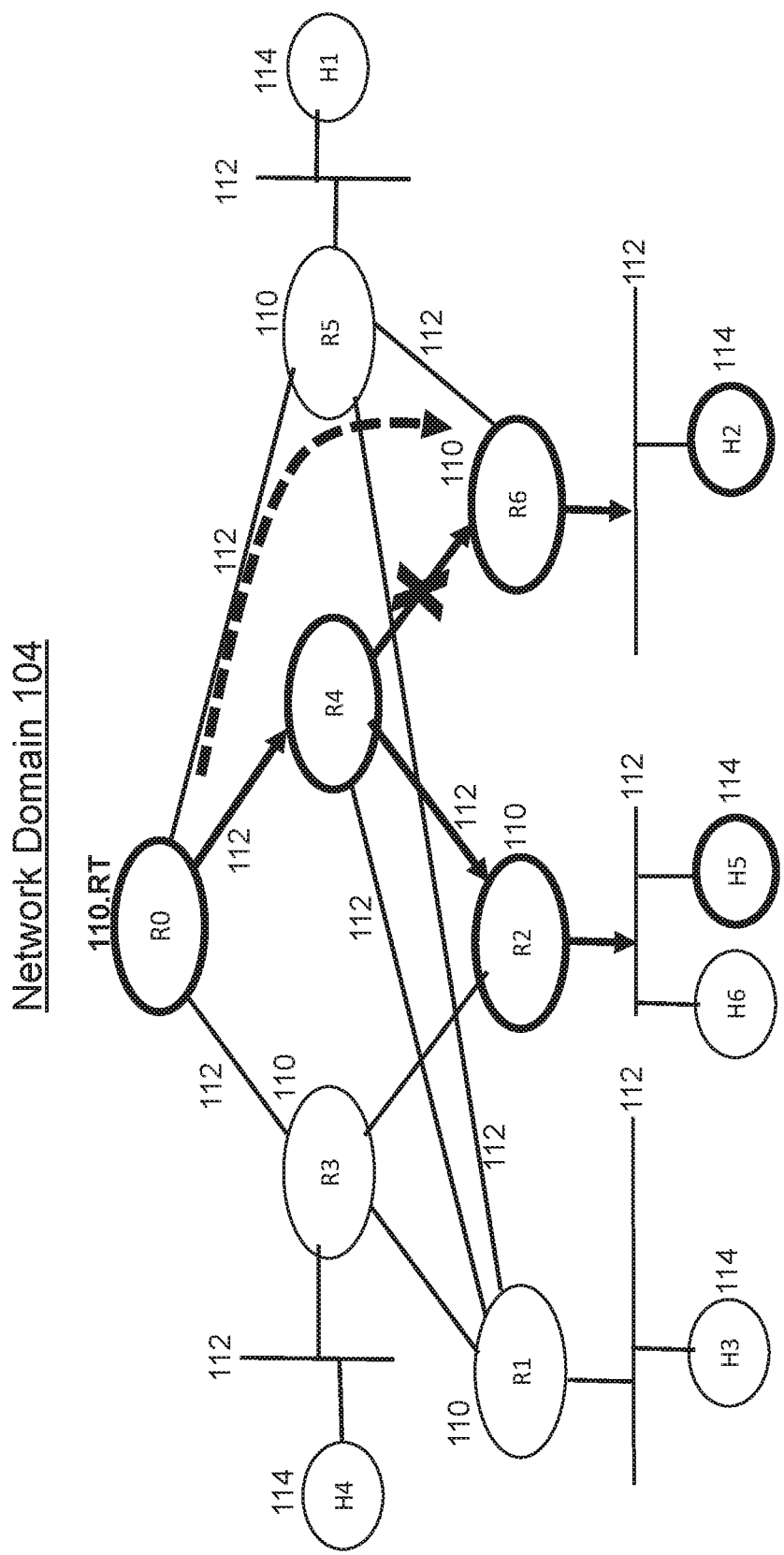
FIG. 6 is a schematic view illustrating an embodiment of a network management method.

To perform the Redirect request, the downstream router sends suitable Join/Prune messages. In the example of FIG. 6, a (*,G) Join is sent to R5. The Join includes an identification of the alternate path R0-R5-R6. The Join is propagated by R5 on the alternate path. The propagated Joins identify the entire alternate path R0-R5-R6, or at least an upstream path portion on which they will need to be propagated.

R6 also sends a (*,G) Prune to R4. If the Prune cannot be sent to R4 on the R4-R6 link due to this link failure, the router R6 may sent a unicast message to R4, over whatever path is available at the time, to request R4 to execute a Prune as if the Prune were sent on R4-R6.

The same process is followed for a SPT, i.e. if the root is a FHR.

In some embodiments, the root is the RP, and the Redirect request (block 540) may request the Last Hop Router (LHR), such as R6, to switch from the RPT to the SPT for one or more of sources S specified in the Redirect request. In some embodiments, the root is the FHR, and the Redirect request may be sent by the FHR, and may request the LHR to switch from the SPT to the RPT for one or more specified sources or for all the sources.

Now some embodiments of the scheme of FIG. 5 will be described in more detail.

Block 510: Tree Topology DB

Block 510 can be implemented using any of the methods described below, or a combination of such methods.

In one method, each time any router 110 creates, deletes, or modifies its MRIB 139C with respect to any tree, the router informs the tree's root 110.RT about the MRIB modification, possibly by a unicast message, so the root 110.RT may update its tree topology DB 410.

In another method, the root 110.RT learns the tree topology from modified Join/Prune messages. Table 2 below shows an exemplary modified Join/Prune message. Table 2 shows only the payload 110.P (FIG. 1B). The IP header of the message can be as specified in PIM-SM, i.e. the IP destination address 110.DA can be "ALL-PIM-ROUTERS", and the IP source address 110.SA can be a domain-wide reachable address of the router sending the Join/Prune message. The domain-wide reachable address can be defined by the IGP (Interior Gateway Protocol), e.g. as a router ID in OSPF (same as router IP address). The TTL field is "1".

All the fields in Table 2 are as in the aforementioned RFC 7761, except for the additional entries "J/P Path" inserted after corresponding entries "Encoded Joined Source Address" and "Encoded Pruned Source Address". As defined in RFC 7761 and illustrated in Table 2, a Join/Prune message may combine multiple Join and Prune messages for individual Join and Prune operations for the same or different groups G. The combined message of Table 2 combines two Joins and two Prunes, for the same group G (defined by "Encoded Multicast Group Address 1"). For each Join or Prune, the source can be S or star (*) as specified by the corresponding "Encoded Joined Source Address" or "Encoded Pruned Source Address". If the source is the star, then the corresponding "Encoded Joined Source Address" or "Encoded Pruned Source Address" includes the corresponding RP address. All the router addresses are domain-wide reachable. For example, in OSPF, each router address is the router ID, defined as the router's highest loopback address or, if the router has no loopback address, the router's highest IP interface address.

Each Join or Prune operation in the combined message is performed separately by the router 110 receiving the message. This receiving router is specified by the "Encoded Unicast Upstream Neighbor Address" in the combined message.

TABLE 2

MODIFED JOIN/PRUNE COMBINED MESSAGE FORMAT

PIM Ver    Type = 3    Reserved    Checksum
Encoded Unicast Upstream Neighbor Address (e.g. R4 or R5)
Reserved    Num groups    Holdtime
Encoded Multicast Group Address 1
Number of Joined Sources    Number of Pruned Sources
Encoded Joined Source Address 1
J/P Path
Encoded Joined Source Address 2
J/P Path
Encoded Pruned Source Address 1
J/P Path
Encoded Pruned Source Address 2
J/P Path The Join/Prune combined message may include, for one or more of the constituent Join or Prune messages, a field "J/P Path" that specifies the path on which the individual Join or Prune is being propagated. In particular, J/P Path specifies the sequence of routers originating or propagating the Join or Prune. In addition, J/P Path may identify the links 112 and/or router interfaces in the path. For example, if a Join was initiated by a node 114 joining a group, the corresponding "J/P Path" starts with the node's designated router (DR), i.e. the LHR. Each router 110 propagating the Join augments J/P Path with the router's ID, and possibly the ID of the link (and/or the router's interface address) on which the Join is being received or propagated. For example, in FIG. 6, when R6 sends a Join to R5, the corresponding "J/P Path" includes only the router R6. When R5 propagates this Join to R0, the corresponding "J/P Path" includes the sequence <R6, R5>. Alternatively, when R6 sends a Join to R5, the corresponding "J/P Path" includes the routers R6 and R5. When R5 propagates this Join to R0, the corresponding "J/P Path" includes the sequence <R6, R5, R0>.

The Prunes' J/P Paths are constructed in the same way.

When a router 110 receives the combined Join/Prune message as in Table 2, the router may extract and separate the individual constituent Joins and Prunes because the individual Joins or Prunes may be associated with different root routers. Each J/P path will follow the corresponding individual Join or Prune.

When the individual Join or Prune reaches the corresponding root 110.RT, the root updates its DB 410 based on the corresponding "J/P Path". The root also updates its MRIB 139 as in conventional PIM. For example, when the root R0 receives the individual Join propagated by R5, the root R0 determines from the corresponding "J/P Path" that the Join came on the path R6-R5-R0, and R0 modifies the tree topology DB 410 to record the tree branch R6-R5-R0 (also denoted as R0-R5-R6 herein) for the corresponding (*,G) state. When R0 receives the Prune from R4, R0 deletes the R0-R4-R6 branch in DB 410. In some embodiments, R0 deletes R0-R4-R6 after receiving the Join without waiting for the Prune.

Sometimes, a Join or Prune does not reach the root. Consider the following example based on the network topology of FIG. 1A, assuming that R0 is the RP for some group G, and assuming use of J/P Paths. At first, the group G was empty, and the RPT had only the root R0. Then H2 joins the group, and R6 sends a Join to R4 with the corresponding J/P Path. R4 propagates the Join to R0. R0 updates the tree topology DB 410 with the path R0-R4-R6. Both R0 and R4 create, in their MRIBs 139, a (*,G) state corresponding to this path (see Table 1). The OIF list in R4 specifies the R4-R6 interface for reaching R6.

Then H5 joins the group. R2 sends a Join to R4. R4 already has a (*,G) state for reaching R6. Therefore, R4 does not propagate the Join to R0, but simply adds the R4-R2 interface to the OF list (Table 1).

In some embodiments, R4 also informs R0 of this Join by encapsulating this Join in a unicast message with the "J/P Path" of R2-R4, and R0 updates its tree topology DB 410 accordingly.

In other embodiments, R4 propagates the Join to R0 with "J/P Path" of R2-R4. If there are intermediate routers between R4 and R0, each intermediate router propagates this Join upstream, updating the J/P Path accordingly, but without changing the router's MRIB. R0 updates its tree topology 410 upon receiving the Join, but does not change its MRIB.

In still other embodiments, R4 does not propagate the Join to R0 and does not inform R0 of the new branch R2-R4. The tree topology DB 410 is incomplete, which may diminish the network's ability to respond to congestion or failures.

In some embodiments, the Prune messages are handled using any of the options described above for the Joins, possibly in the same way as the Joins, or in some other way. For example, in some embodiments, the Join messages include J/P Paths, but the Prune messages do not; rather, when a Prune leads a router 110 to modify its MRIB, the router 110 informs the root R0, possibly via a unicast message, specifying the MRIB modification.

In another exemplary embodiment, different trees are handled differently. For example, J/P Paths may be used for some trees, but for other trees the topology changes may be conveyed to the roots by unicast messages specifying the MRIB changes in the trees.

In PIM-SM, each router 110 periodically re-sends Joins to confirm that the router still wishes to receive the traffic for the corresponding groups and sources. Depending on the embodiment, the routers may or may not inform the root of the periodic Joins if the Joins do not change the routers' MRIBs, and the periodic Joins may or may not have J/P Paths.

Router Identification

In some embodiments, routers 110 are identified by Node IDs in J/P Paths and possibly in DB 410 and/or 140. Use of Node IDs instead of router IDs improves security. Also, the Node IDs can be shorter than the router IDs, to reduce the size of the J/P Paths and possibly of DB 410 and/or 140. The Node IDs can be assigned by the administrator or in some other way. Node IDs may be propagated by the IGP throughout domain 104.

Figure 7:
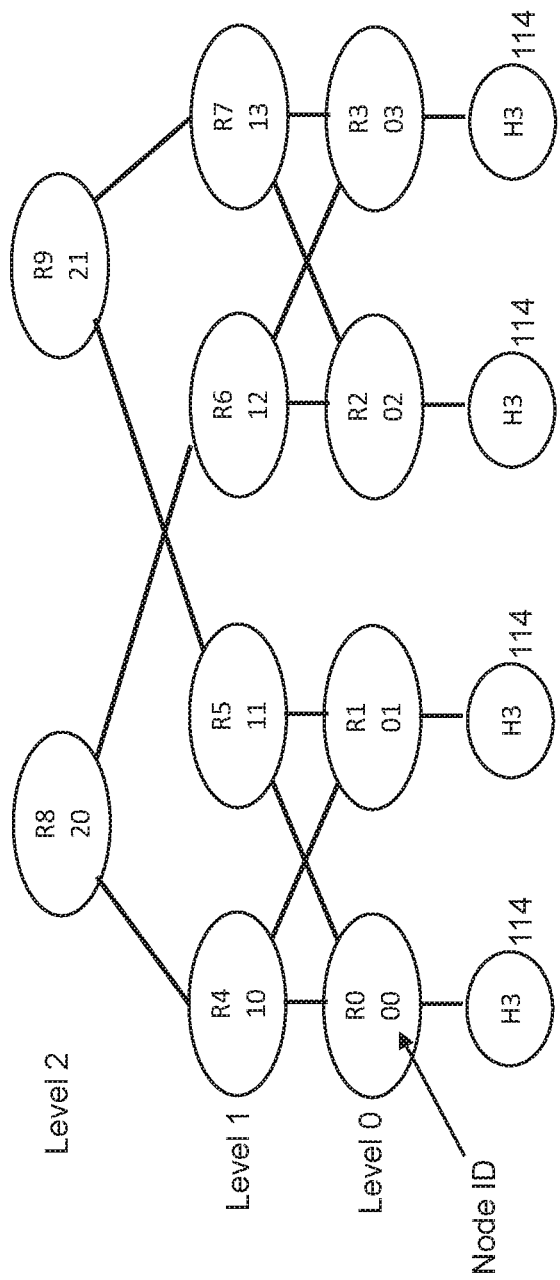
FIG. 7 is a schematic view illustrating a network embodiment.

Another possible Node ID assignment scheme is suitable for multi-level networks such as shown in FIG. 7. Examples of multi-level networks, such as Clos networks and fat-tree networks, are described in U.S. Pat. No. 9,210,071, issued Dec. 8, 2015 (inventors: Allan et al.); and U.S. Pat. No. 8,170,040, issued May 1, 2012 (inventor. Konda); both incorporated herein by reference. A multi-level network includes multiple levels of routers 110 (levels 0, 1, 2 in FIG. 7). Each router is directly connected only to routers of adjacent levels. A router's Node ID may consist of: the level number, and the router number at that level. For example, in one scheme, for routers R0 through R3, the level number can be defined as 0, and the Node IDs can be from 00 (for router R0) through 03 (for R3). For routers R4 through R7, the level number can be 1, and the Node IDs can be from 10 (for R4) through 13 (for R7). And so on.

Each J/P Path may be a sequence of the routers' Node IDs in the path (e.g. from the LHR to the root). The path's links may be specified explicitly in J/P Path, or may be omitted if they can be calculated from the Node IDs and DB 140.

In some embodiments, the J/P Path routers are defined as a bitmap: each bit corresponds to a router, and the bit is set if, and only if, the router is in the J/P Path. An example bitmap scheme for identifying routers is described in RFC 8279, "Multicast Using Bit Index Explicit Replication (BIER)", Internet Engineering Task Force (IETF), November 2017, incorporated herein by reference.

However, the bitmap may or may not be adequate to define the sequence of the routers in J/P Path. In some embodiments, the root can calculate the sequence from the bitmap using the lowest cost to the root the lowest cost should decrease along the path from the LHR to the root. Also, the routers adjacent to each other in the route sequence can be neighbors in the network, and the root may use this fact to determine the router sequence. However, the invention is not limited to increasing or decreasing costs along paths, and the adjacency in the sequence does not necessarily define the links in the path. If the bitmap is inadequate, additional information is provided in J/P Path to allow the root to determine the router sequence as needed for DB 410.

Block 520: Feedback Messages

An exemplary feedback message is shown in Table 3. The feedback message can be a unicast IP message. Only the payload 120.P is shown (FIG. 1B). The IP destination address 120.DA of the feedback message can be the root's router ID. The source address 120.SA can be the router ID of the router sending the feedback message.

The Type field has a value identifying the message as the Feedback message. The last line identifies the link or interface or router whose congestion-or-failure state is reported in the "Feedback" field of the message. The "Feedback" field identifies the congestion-or-failure state, e.g. how busy the link or interface or router is in terms of bandwidth utilization or store-and-forward memory utilization or forwarding delays or some other parameters. Multiple parameters can be provided in the same Feedback message. In one embodiment, the following codes are used for the Feedback field:

0 means no congestion or failure.

1 means there is a problem on the interface or link or router specified in the last row of Table 3. For example, 1 may indicate that the traffic bandwidth on the specified link exceeds some link utilization threshold (e.g. exceeds 80% of the link's total bandwidth).

2 means traffic exceeds a higher threshold (e.g. 90% of the total bandwidth).

3 means traffic is being dropped due to congestion.

The Feedback message can include other pertinent information, e.g. the (S,G) or (*,G) state of the traffic being dropped, as indicated in the last row of Table 3.

The Feedback values may be associated with colors for use on the administrator's display if needed: e.g. Green, Yellow, Red, and Black for 0, 1, 2, and 3 respectively.

Other codes or coded information can be present in the message.

TABLE 3

FEEDBACK MESSAGE FORMAT

| Version | Type | Feedback | Checksum |
|---|---|---|---|
| State, i.e. (S, G) or (*, G), and/or interface's IP address, or other information identifying the congestion or failure | | | |

Block 540: Redirect Request

An exemplary Redirect request is illustrated in Table 4. The source and destination IP addresses 120.SA and 120.DA can be the router IDs, respectively, of the sending root and of the router requested to initiate the tree modification. The payload 120.P includes the fields described in Table 4, and additional fields such as Version, Type, and Checksum as in Table 3; the Type value identifies the message as Redirect request. As shown in the last row of Table 4, the alternate path can be specified as the sequence of the Node IDs, possibly with link and/or interface IDs (e.g. IP interface addresses), and/or via the bitmap, as described above. Alternatively, the Redirect request may include a request to switch from RPT to SPT or vice versa, and may specify the sources S and groups G for this switch as appropriate.

TABLE 4

REDIRECT REQUEST

| Encoded source/group addresses (S, G) or (*, G) |
|---|
| Alternate path, or command to switch from RPT to SPT or vice versa, or other information as appropriate |

Block 550: Tree Modification

Figure 8:
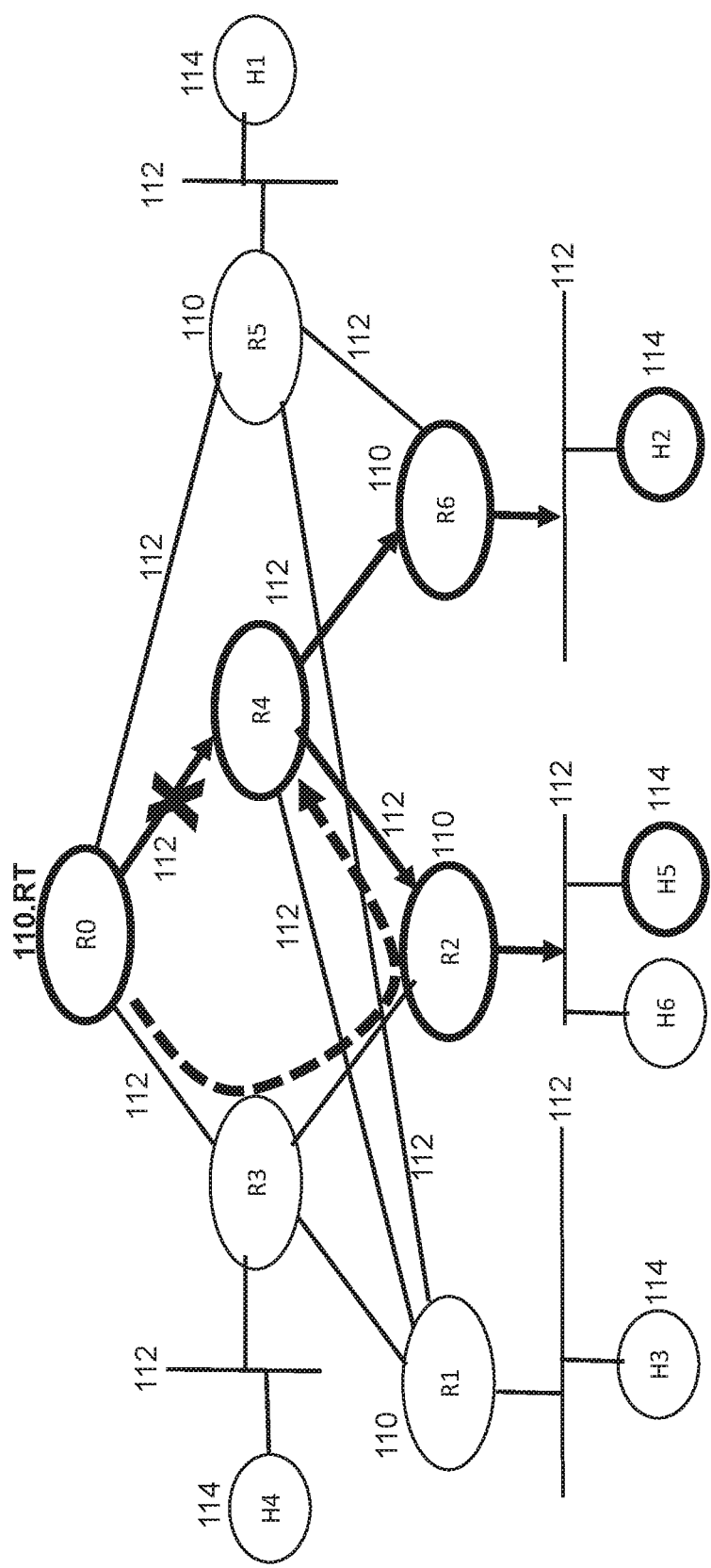
FIGS. 8 and 9 are schematic views illustrating some embodiments of network management methods.

In the example of FIG. 8, suppose the original RPT had a root R0 with a path R0-R4 branching, at R4, into R4-R6 and R4-R2. Then the R0-R4 link became congested, and R0 sent a Redirect request to R4 with the alternate path R0-R3-R2-R4. In response, R4 sends a Join to R2. An exemplary Join format is shown in Table 5. This Join specifies the alternate path in the Alternate Path field following the corresponding "Encoded Joined Source Address". The Alternate Path field is unchanged when the Join is propagated to R2, then to R3, and then to R0. Alternatively, the Alternate Path may be modified by deleting, at each router, the Alternate Path portion downstream of the router. Indeed, the root already knows the Alternate Path (since the root calculated the Alternate Path in block 530 and included it in the Redirect request in block 540); and the intermediate routers need to know only the upstream portion of the Alternate Path in order to propagate the Join.

The Join of Table 5 may be combined with other Joins and/or Prunes.

R2 may also send a Prune to R4 to prune the R2-R4 path since R2 will receive the traffic via R3. This Prune may have the J/P Path field as in Table 2 so that the root R0 would be informed of the Prune. (In this example, the Prune's J/P Path does not need to include any path portion downstream of R2, even if the network domain has routers downstream of R2.)

TABLE 5

MODIFED JOIN/PRUNE WITH ALTERNATE PATH

| PIM Ver | Type = 3 | Reserved | Checksum |
|---|---|---|---|
| Encoded Unicast Upstream Neighbor Address (e.g. R4 or R5) | | | |
| Reserved | Num groups | | Holdtime |
| Encoded Multicast Group Address 1 | | | |
| Number of Joined Sources | | Number of Pruned Sources | |
| Encoded Joined Source Address 1 | | | |
| Alternate Path | | | |

FHR to RP Path Management

A FHR can forward traffic both on the SPT and to the RP for the RPT. For example, in FIG. 9, R1 is the FHR for H3. H3 is a source of multicast traffic for some group G including H5, H2, and H1. The SPT includes the link R1-R4, and the branches R4-R2 (for H5) and R4-R6 (for H2). At the same time, R1 sends the traffic to RP router R0, on the path R1-R3-R0, for forwarding on the RPT. The RPT includes the link R0-R5 for H1.

Figure 10:
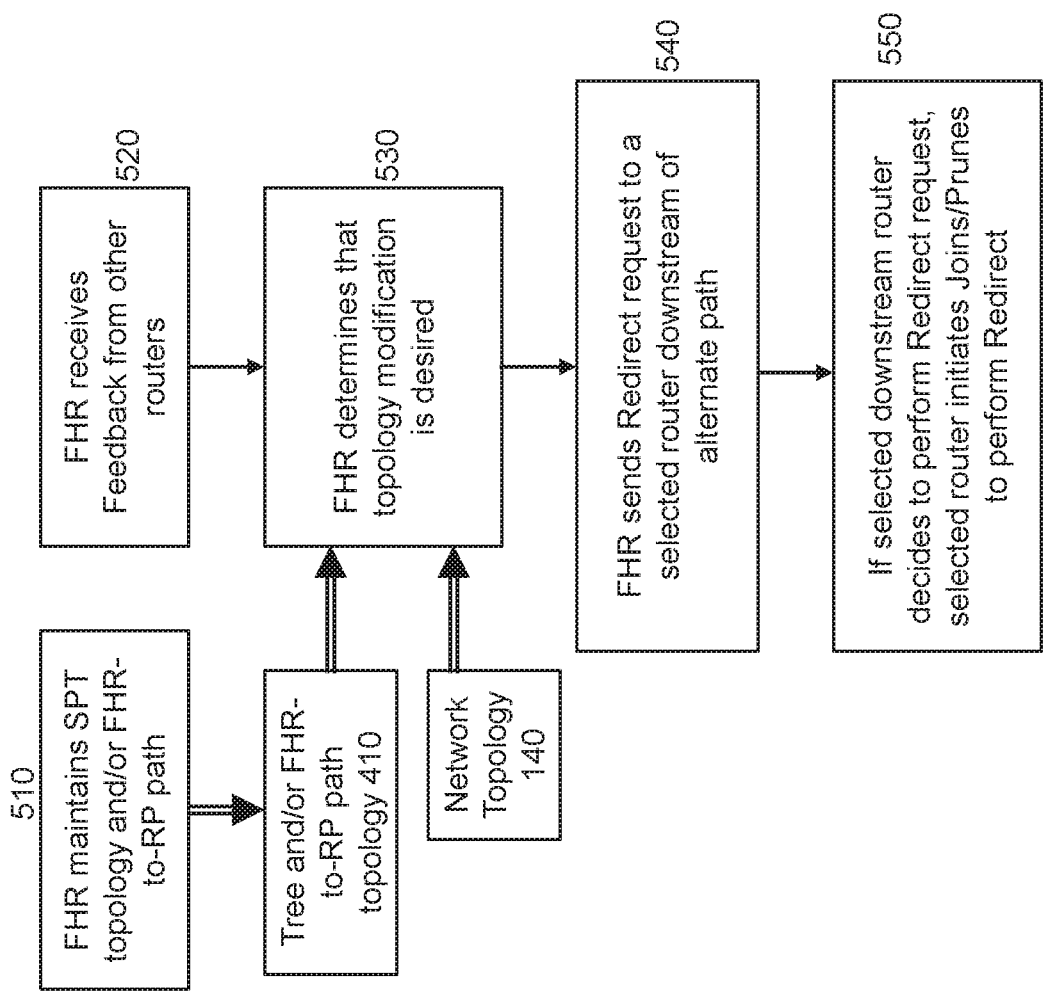
FIG. 10 is a flow chart illustrating an embodiment of a network management method.

In R1, the DB 410 may include the R1-R3-R0 path to the RP, and this path can be managed in the same way as the SPT. This is so even if the SPT is empty. The network management is illustrated in FIG. 10. As is known from PIM-SM, when H3 first starts sending multicast traffic, R1 may, at first, encapsulate the multicast packets in unicast packets to R0 (Register operation) because initially R1's MRIB is not provisioned to forward multicast traffic. Upon receipt of the encapsulated packets, R0 (the RP) sends a Join towards R1. The Join is received by R3, then propagated to R1. Upon receipt of the Join, R1 and R3 provision their MRIBs to forward multicast packets to R0, and R1 starts sending the multicast packets without encapsulation.

Figure 9:
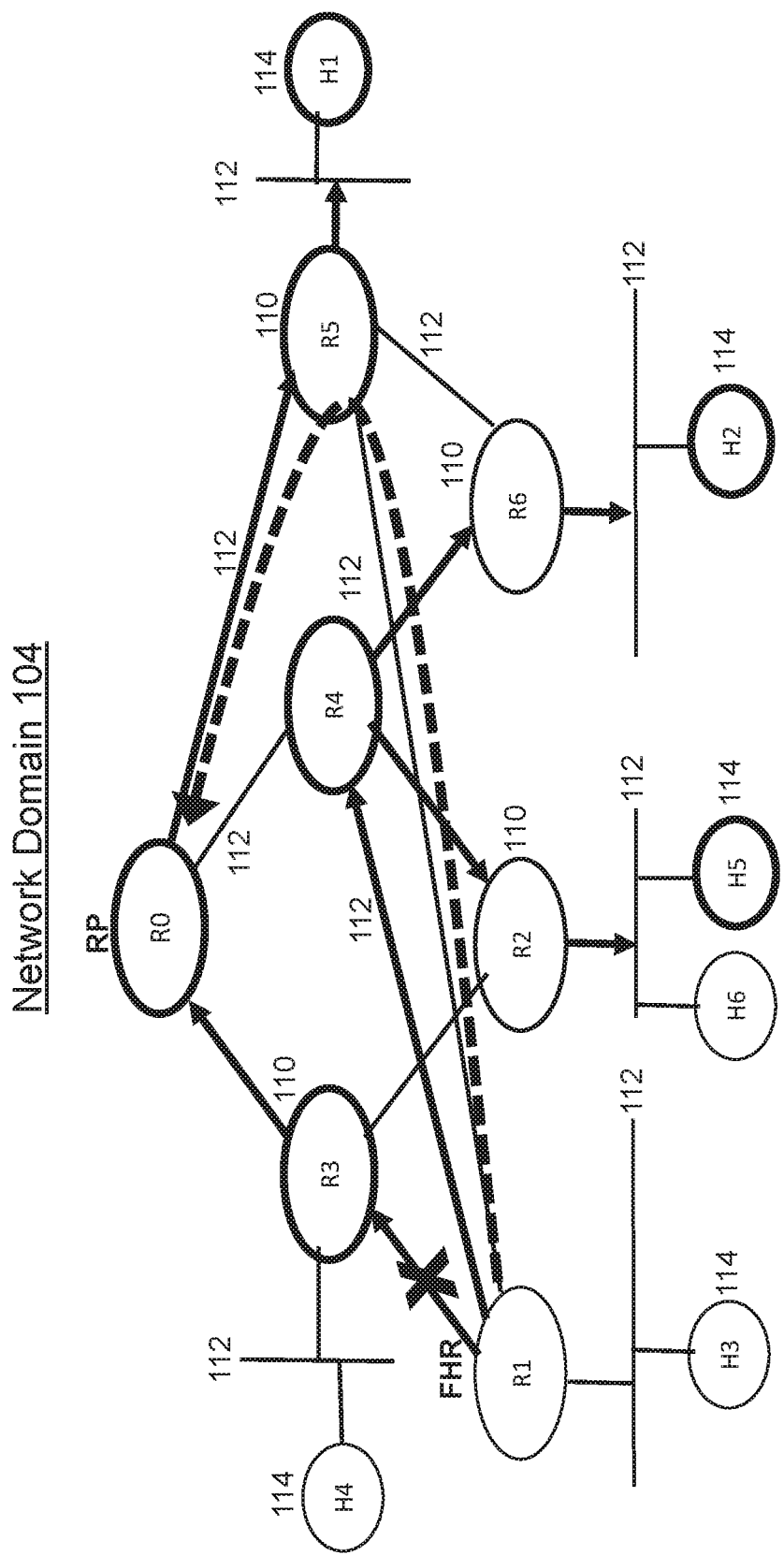

In some embodiments, regardless of whether the SPT is empty, the FHR router R1 creates and maintains, in its control plane 110C, DB 410 for storing the topology of the path from R1 to R0 (block 510 in FIG. 10) in addition to the SPT topology. The R1-to-R0 path topology may be formed using any techniques described above in connection with FIG. 5, e.g. using J/P Path in the Join that R0 sends towards R1. In block 520 (FIG. 10), routers 110 (including R0 and R3) provide R1 with feedback messages regarding the congestion or failure on the path from R1 to R0, as described above in connection with FIG. 5. Based on the feedback, or on R1's own determination of congestion or failure on the R1-R3 link, R1 may decide to modify the R1 to R0 path (block 530 in FIG. 10), and may determine an alternate path. In the example of FIG. 9, R1 discovered congestion of failure on the R1-R3 link, and R1 decides to form an alternate path R1-R5-R0. In block 540, R1 sends a unicast Redirect request to R0, specifying the alternate path (see Table 4). In block 550, the router receiving the Redirect request (i.e. R0) may initiate a Join to establish the alternate path to R1 (as in Table 5). The other features can be as in FIG. 5.

ECMP Management

In some embodiments, DB 410 allows non-local extension of services previously available locally via ECMP Redirect (see FIG. 3). For example, in FIG. 1A, router R2 has multiple paths to R0, including R2-R4-R0 and R2-R3-R0. In some embodiments, these paths form an ECMP group. When sending Joins for a given group G towards the root R0, router R2 may send a Join to R4 or R3. For example, in some embodiments, R2 selects R4 or R3 based on a hash of some fields in the Join packet. In other embodiments, R2 selects R4 or R3 based on the maximum available bandwidth on the links R2-R3 and R2-R4, or based on the maximum total bandwidth on these links.

Suppose a Join was sent to R4. R4 propagates the Join to R0, and R0 records the path R0-R4-R2 for a given state, i.e. (S,G) or (*,G) or (S,G,rpt), in its topology DB 410. R0 also updates its MRIB 139.

Suppose the router R2 sends another Join for the same state to R3. When this Join propagates to R0, the router R0 updates its MRIB, to send the multicast packets to both R3 and R4 as in prior art. However, in addition, router R0 may detect, via tree topology 410, that the Joins originate from the same LHR R2. Router R0 may send a Redirect message to R2, requesting R2 to prune the path through R3 and just use the path through R4. If R2 performs this request, then the multicast messages from R0 to R2 will go only through R4, and will not be duplicated through R3.

These services do not require R2 to be the LHR. R2 can be any router on a path from the LHR to the root of SPT or RPT. Further, while the ECMP paths R2-R3-R0 and R2-R4-R0 are only two hops each, the ECMP paths can be any number of hops.

In some embodiments, R2 and R4 form a Virtual Link Trunking (VLT) System, such as described in the aforementioned U.S. Pat. No. 9,210,072.

As can be seen from description of some embodiments hereinabove, the root router 110.RT acts in some way as a controller of a software defined network (SDN); see U.S. Pat. No. 9,276,877 B1 (issued Mar. 1, 2016; inventors: Chua et al.); and 9,300,483 B2 (issued Mar. 29, 2016; inventors: Banavalikar et al.), both incorporated herein by reference. However, some embodiments of the present invention have relatively low complexity, and do not require a separate controller system. Also, some embodiments can be retrofitted into the existing technology, e.g. PIM-SM, with minimal changes to routers, possibly with no change to the data planes. (The operations of FIGS. 5 and 10 can be implemented in the control planes.) The invention is not limited to such embodiments however.

Multicast in Hybrid SDN/IP Network

Figure 11:
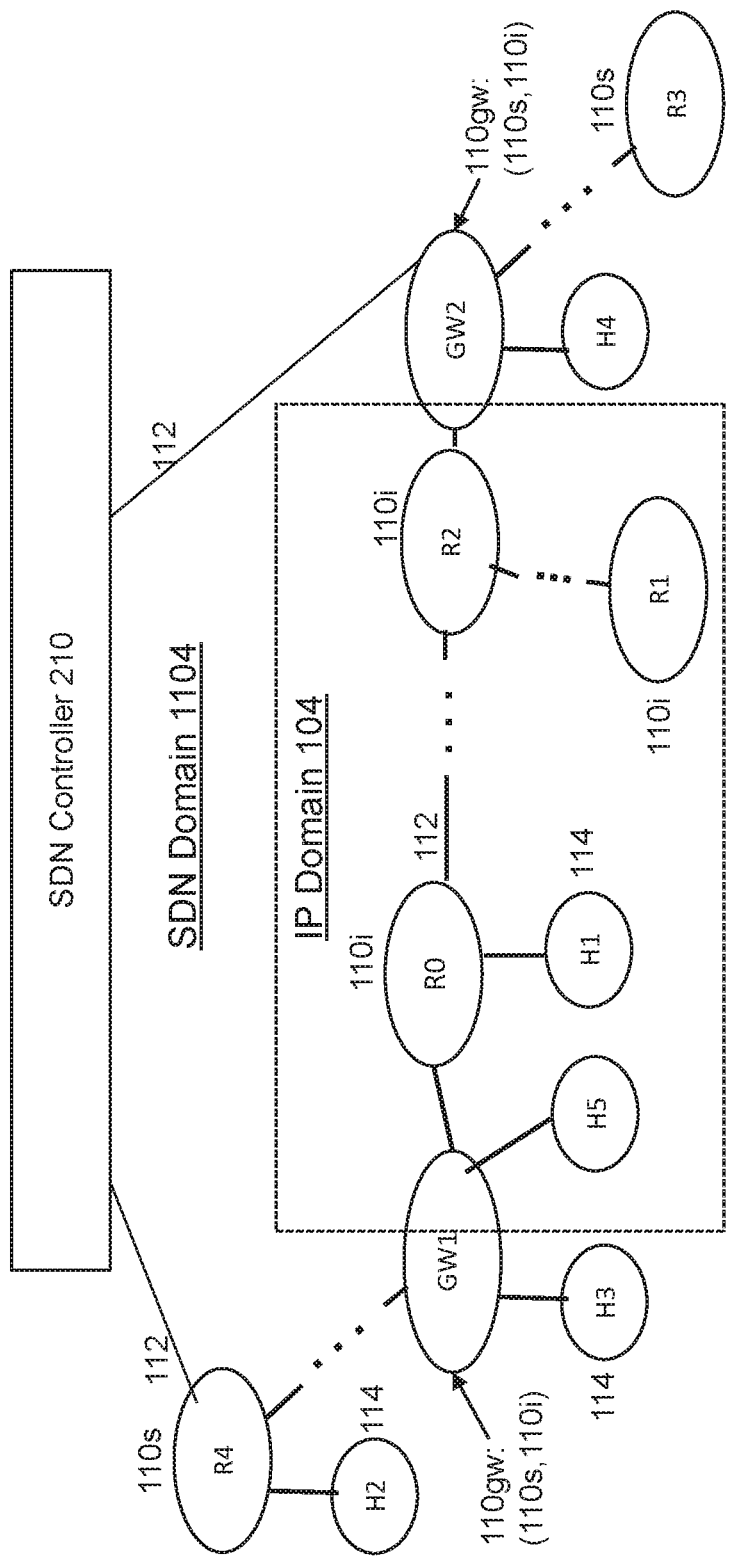
FIG. 11 is a schematic view illustrating a network embodiment.

FIG. 11 illustrates a hybrid network having an IP SDN domain 1104 with SDN controller 210, and having a non-SDN IP domain 104. Domain 104 includes routers 110$i$, and may operate as in FIGS. 4-10 or in some other way as described below.

The SDN domain routers are shown at 110$s$. The SDN controller may communicate with the routers 110 over links 112, via IP for example.

The network also includes gateway routers 110$gw$, marked GW1 and GW2, providing interface between SDN domain 1104 and IP domain 104. Each gateway 110$gw$ is also marked as (110$s$,110$i$) to indicate that the gateway is part of both domains 104, 1104. Below, each of references "110$i$", "110$s$" includes the gateways unless indicated otherwise.

SDN domain 1104 may operate according to any suitable protocol, e.g. OpenFlow; see, for example, U.S. Pat. No. 9,843,504, issued Dec. 12, 2017 (inventors: Han et al.), incorporated herein by reference. But the invention is not limited to OpenFlow.

Nodes 114 can be connected to routers 110$i$, 110$s$, or both: a node 114 can be connected to both SDN and non-SDN routers.

As in FIG. 4, each gateway 110$gw$ may include control plane 110C and data plane 110D capable of non-SDN operation. The control plane may store network topology 140 of IP domain 104, and store routing table 138C for the IP domain. The data plane's routing table 138D may be a merger of the IP domain routing table and the SDN routing table configured by SDN controller 210.

In some embodiments, some or all of the IP domain enhancements described above in connection with FIGS. 4-10 are exploited to allow SDN controller 210 to control multicast transmissions inside IP domain 104. For example, if a multicast distribution tree needs to have a root 110.RT in IP domain 104, the tree root can be placed in a gateway 110$gw$. Both the RPs and the FHRs can be restricted to gateways 110$gw$; for example, in some embodiments, all the designated routers (DRs) in IP domain 104 are in gateways 110$gw$. The gateways can inform the SDN controller 210 of Feedback, J/P Path, and other messages generated in IP domain 104; see blocks 510, 520 in FIGS. 5 and 10. The SDN controller can configure the IP domain 104 via Redirect requests sent to routers 110$i$ directly or through the roots; see block 540 in FIGS. 5 and 10. The entire hybrid network 104, 1104 can be managed essentially as in FIGS. 5 and 10, with the SDN controller performing the operations 510, 520, 530, 540.

However, some embodiments described below do not assume that the tree roots are at the gateways.

Figure 12:
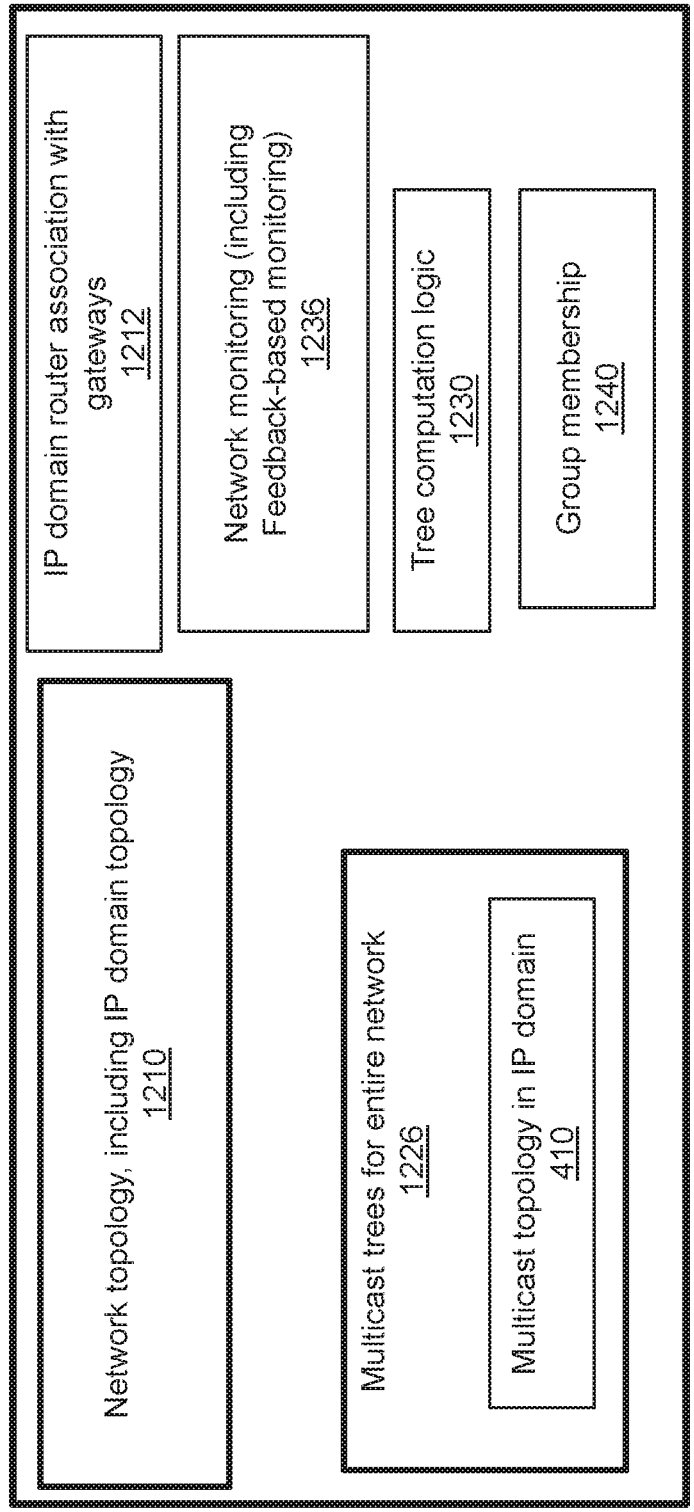
FIG. 12 is a schematic view illustrating a network controller embodiment.
Figure 13:
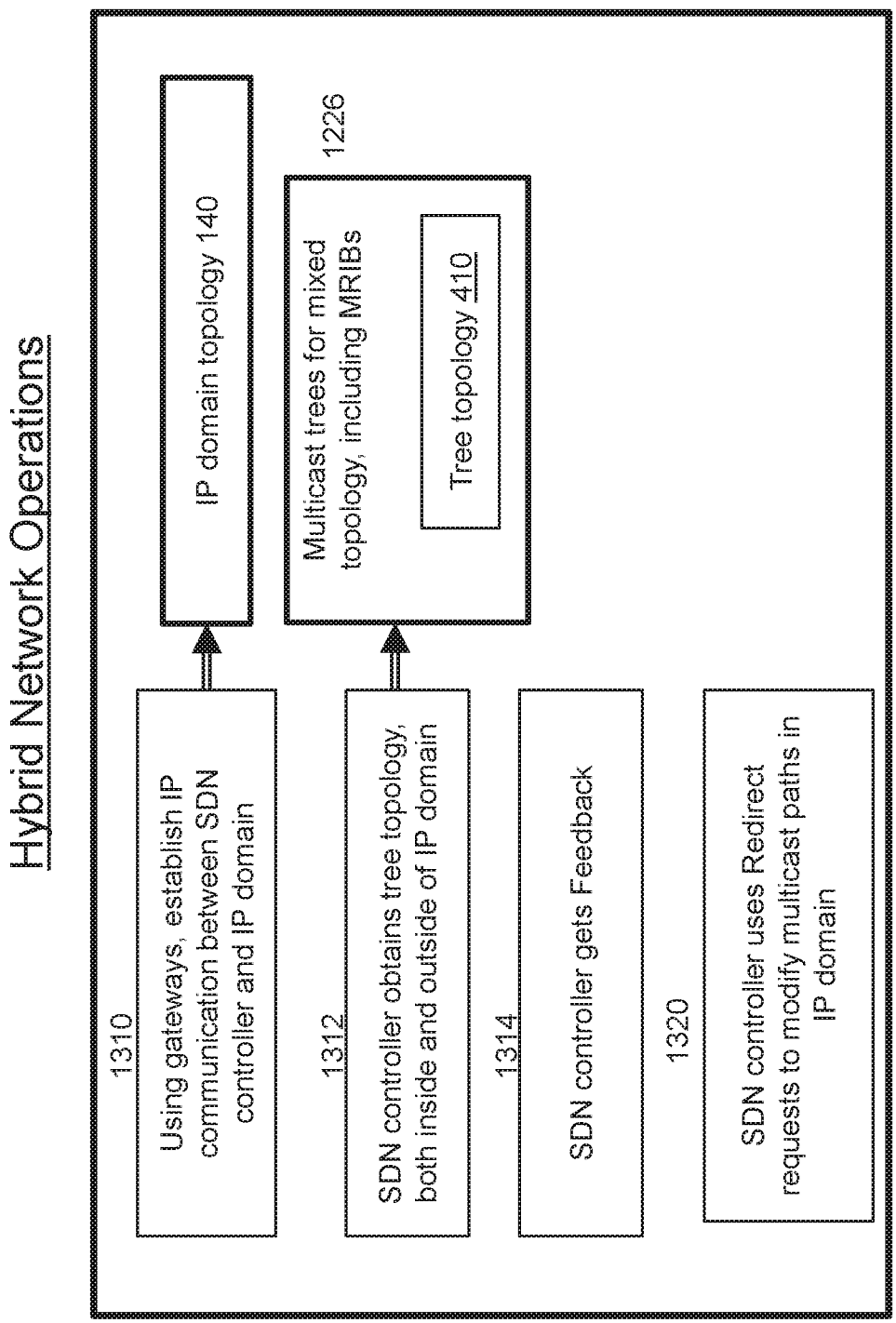
FIG. 13 is a schematic view illustrating an embodiment of hybrid network operations.

FIG. 12 illustrates some features of some embodiments of SDN controller 210. FIG. 13 illustrates exemplary operations in the hybrid network. The SDN controller includes one or more computer processors and memory to perform operations illustrated in FIGS. 12-13.

In block 1310 (FIG. 13), the hybrid network is provisioned for IP communication between IP domain routers 110$i$ and SDN controller 210. This can be done as follows:

The SDN controller obtains the topology of the SDN domain using the SDN discovery protocol in effect, e.g. OpenFlow Discovery Protocol (OFPD) if the SDN network is OpenFlow. This topology database is stored in block 1210 (FIG. 12), enabling the SDN controller to communicate with routers 110$s$, including gateways 110$gw$.

Gateways 110$gw$ participate in the Interior Gateway Protocol (IGP) in IP domain 104, so each gateway stores the network topology DB 140 (FIG. 4) for IP domain 104. In particular, each gateway may store the router ID and the node ID of each router 110$i$ (including 110$gw$). The node IDs are global, i.e. unique across the entire network 1104, 104; they can be assigned by an administrator or in some other way. Using OSPF as an example, each gateway stores the Link State Advertisements transmitted by all routers 110$i$. One or more of the gateways send the network topology DB 140, including the Link State Advertisements and the correspondence between the router IDs and node IDs, to SDN controller 210, which stores this information in block 1210 (FIG. 12). In particular, the SDN controller 210 may calculate, or receive from the gateways, the routing tables 138

(FIG. 4) for each router 110*i*. Further, the SDN controller knows the IP addresses of routers 110*i* and their interfaces, can send IP packets to routers 110*i*, and can calculate multicast paths through the IP domain using the shortest-path metric or any other metric enabled by the topology DB 1210, so as to meet load-balancing, congestion-avoidance, failure-avoidance, security, QoS, or other policy objectives.

To enable communication from routers 110*i* to SDN controller 210, one or more gateways 110*gw* advertise, in IP domain 104, an IP address of SDN controller 210. (An advertisement can be a broadcast or multicast message for example) Alternatively or in addition, the gateways can advertise themselves as providing a forwarding service to forward IP packets from routers 110*i* to SDN controller 210. In either case, these advertisements enable the routers 110*i* to send IP packets to the SDN controller (either directly if the routers have the controller's IP address, or through gateways 110*gw*).

These advertisements are omitted in some embodiments, e.g. if the gateways include all the tree roots of the IP domain as noted above, because in such embodiments the non-root routers 110*i* can be oblivious of SDN domain 1104.

In some embodiments, SDN controller 210 selects one or more gateways to send the advertisements described above. In some embodiments, each router 110*i* is associated with one gateway 110*gw* serving as an intermediary between the router 110*i* and SDN controller 210; each gateway sends the advertisements only to the gateway's associated routers 110*i*. The specific association between a router 110*i* and a gateway 110*gw* can be established by each gateway using its IGP data, and/or by the SDN controller using the database 1210. For example, each router 110*i* can be associated with the nearest (shortest path) gateway 110*gw*. The SDN controller stores the association in block 1212 (FIG. 12).

Of note, SDN domain 1104 and/or IP domain 104 may contain a VLT (see for example the aforementioned U.S. Pat. No. 9,210,072). In the SDN domain, the VLT peer routers can be assigned an anycast node ID. In setting up multicast paths (block 1312 described in more detail below), the controller can program any router upstream of the VLT to send the traffic to the anycast node ID. Also, the controller can program each VLT peer to send the traffic for the corresponding (S,G) or (*,G) state to the receiver(s).

In block 1312 (FIG. 13), the SDN controller obtains, and maintains, multicast tree topology DB 1226 (FIG. 12) for the entire network, including IP domain 104 and SDN domain 1104. The tree topology portion inside SDN domain 1104 can be obtained using conventional SDN methods. The multicast topology DB 410 inside IP domain 104 can be obtained as described below.

In block 1314, the SDN controller gets Feedback from IP domain 104 and, possibly, SDN domain 1104. For IP domain 104, this operation is similar to operation 520 in FIG. 5 or 10, except that the Feedback does not have to be sent to a tree root—each router 110*i*, 110*gw* can send Feedback to the SDN controller based on the provisioning in block 1310. Alternatively, the Feedback can be sent to the root, and the root can forward the Feedback to the SDN controller.

The Feedback is stored in the SDN controller's block 1236 (FIG. 12).

In block 1320, the SDN controller may modify multicast paths in IP domain 104 using Redirect requests as described above in connection with blocks 540, 550 of FIG. 5 or 10.

Further details of some embodiments are as follows:
Block 1312: Obtaining Tree Topology in IP Domain
Multicast Tree Entirely within IP Domain In some embodiments, if a multicast tree is entirely within the IP domain 104, the SDN controller can obtain the tree topology in IP domain 104 using any of the techniques described above for block 510 of FIGS. 5 and 10. For example, in some embodiments, the tree topology is obtained by the tree root RP or FHR as described above, and the root sends the topology DB 410 to the SDN controller. (Even if the root is not at a gateway 110*gw*, the root can be enabled to communicate with the SDN controller by techniques described above in connection with block 1310.) The root can obtain the tree topology from notifications sent by each router 110*i* whenever the router's MRIB 139 changes, and/or from the J/P Path messages, as described above in connection with FIGS. 4-10.

In some embodiments, the root does not store the tree topology DB 410, but the root and/or other routers 110*i* send the pertinent data (routers' notifications and/or J/P Path data) to the SDN controller, enabling the SDN controller to calculate/maintain the tree topology as in block 510 of FIG. 5 or 10. The calculation can be performed by tree computation logic 1230 (FIG. 12), which also determines the tree topology for SDN domain 1104.

In some embodiments, if a tree is entirely within the IP domain 104, the network executes the process of FIG. 5 or 10 to manage the multicast operations for the tree, reconfiguring the multicast paths as needed (blocks 540, 550), but the root's functions are performed by SDN controller 210 instead of the root.

Multicast Tree not Restricted to IP Domain

Figure 14:
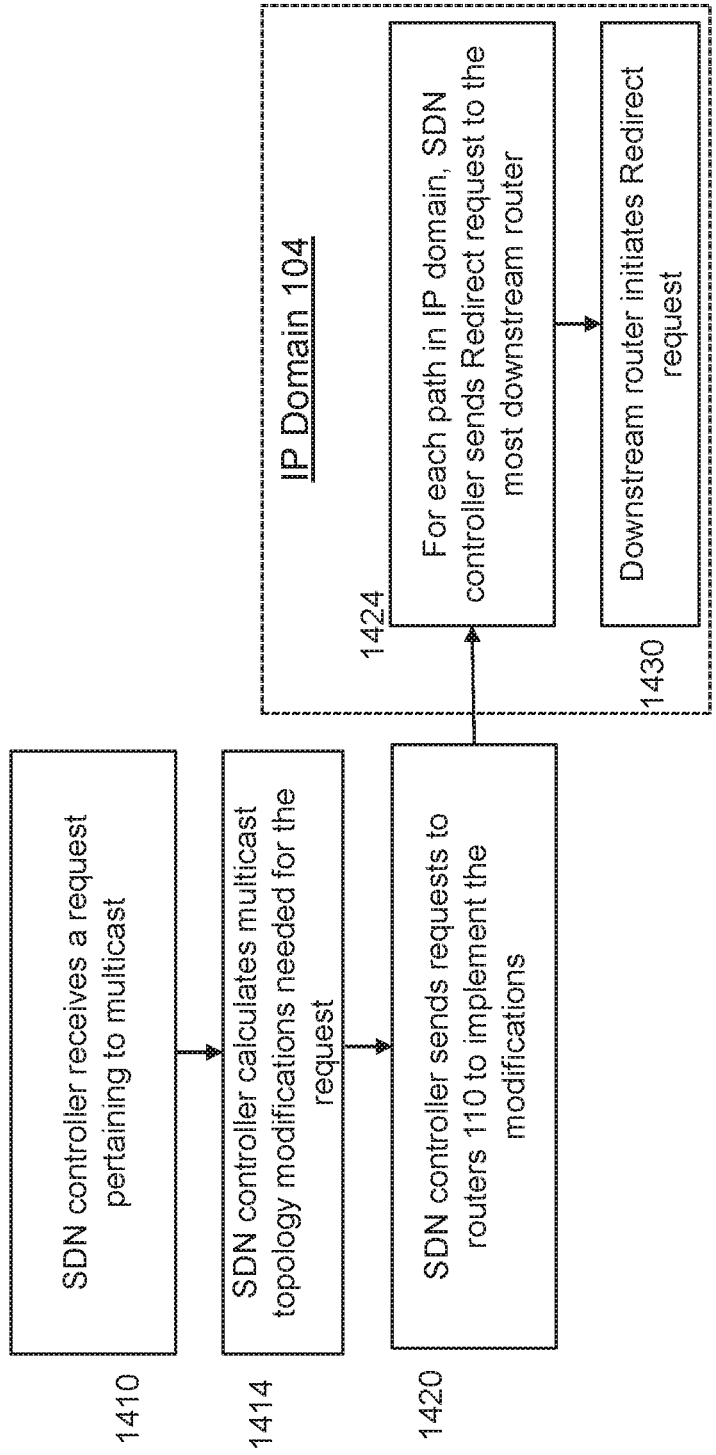
FIGS. 14 and 15 are flow charts illustrating embodiments of network management methods.

FIG. 14 illustrates another embodiment of block 1312; this embodiment is suitable both for the special case when the tree lies entirely in IP domain 104, and for a more general case when the tree may traverse both the SDN and IP domains.

In block 1410, the SDN controller receives a request pertaining to multicast. This request may be triggered, for example, by a node 114 wishing to join or leave a multicast group G, and sending a suitable (S,G) or (*,G) request to its designated router 110 (LHR) according to IGMP (Internet Group Management Protocol) or some other protocol. If the node's request requires the LHR to join or leave a multicast path, the LHR may send a corresponding request to the SDN controller in block 1410.

In another example, the request in block 1410 may be a request from the LHR to switch from one multicast tree to another, e.g. from RPT to SPT.

In still another example, a node 114 sends traffic, addressed to a multicast group, to the node's designated router (FHR), and if the FHR is not already provisioned to send traffic to the multicast group, then the FHR may request the SDN controller, in block 1410, to become so provisioned.

In another example, the request is generated by the controller's network monitoring block 1236 (FIG. 12), possibly based on Feedback messages as in block 530 in FIG. 5 or 10, to relieve congestion, or bypass a failed link or router, or eliminate duplicate traffic for example.

In block 1414, SDN controller 210 calculates the multicast path changes needed to satisfy the request. This calculation may be performed by tree computation logic 1230 (FIG. 12), as described in connection with block 530 of FIG. 5 or 10 or in some other way. If a new RPT must be created (e.g. for a node 114 joining a new group or sourcing traffic to a new group), SDN controller 210 may select the root router 110 (110*s* or 110*i*) for the tree if the root has not yet been selected. Also, based on network topology DB 1210 and, possibly, the existing multicast paths per DB 1226, SDN controller 210 determines the multicast distribution path(s) to be added or deleted. The paths may be calculated in block 1414 by known methods, taking into account any appropriate criteria such as the minimal number of hops, minimal cost, underutilized resources (e.g. links 112 with maximum available bandwidth are preferred), congestion, or any other criteria. If IP domain 104 contains a VLT, the paths may be calculated to avoid traffic replication so that each data packet would be sent through the VLT just once, i.e. through only one of the VLT peers.

In block 1420, SDN controller 210 sends requests to routers 110 to configure the routers' data planes as needed to implement the changes. These requests may specify the (S,G) or (*,G) pair. For SDN routers 110s, this operation is performed based on the SDN protocol in effect.

For the IP domain routers 110i, this operation can be performed as shown in blocks 1424, 1430. (For gateways 110gw, the operation 1420 can be performed either as for SDN routers 110s, or for non-SDN routers 110i.) In block 1424, for each new path in IP domain 104, SDN controller 210 sends a Redirect request to the most downstream router in the path. For example, referring to FIG. 11, suppose the SDN controller received, in block 1410, requests from routers R1 and R3 to join a multicast group rooted at R4. In block 1414, the SDN controller calculated the new paths as R4-GW1-R0-R2-R1 and R4-GW1-R0-R2-GW2-R3. There are two corresponding paths in IP domain 104: GW1-R0-R2-R1, and GW1-R0-R2-GW2. In block 1424, the SDN controller sends a Redirect request to R1; this request specifies the path GW1-R0-R2-R1. The SDN controller also sends a Redirect request to GW2, specifying the path GW1-R0-R2-GW2. The IP domain routers execute the Redirect requests in block 1430, similarly to block 550 of FIG. 5 or 10.

Also, in block 1420, the SDN controller sends a request to router R4 to configure its data plane to send the pertinent multicast traffic to GW1. In addition, the SDN controller sends a request to router R3 to configure its data plane to receive the pertinent multicast traffic from GW2.

If the request in block 1410 involves deleting a multicast path (e.g. because anode 114 is leaving a multicast group, and the group has no other members having the same LHR; or because the node 114 needs to switch to a different tree), then the Redirect request in block 1424 can include a request to prune a multicast path. The Redirect request to prune may have a format similar to Table 4, but does not need to specify a complete propagation path for the Prune. The Redirect request can be sent to the most downstream router 11i in the path to be deleted. In block 1430, the most downstream router initiates the deletion by updating its MRIB 139 and sending a Prune to the upstream neighbor in the path for the pair (S,G) or (*,G); the upstream neighbor is the RPF router or is specified in the Redirect request.

The SDN controller keeps its tree topology DB 1226 and group membership DB 1240 up-to-date. For example, each LHR 110 may inform the SDN controller of any node 114 joining or leaving the group even if no changes to multicast paths are needed, thus allowing the SDN controller to update group membership 1240. In other embodiments, the SDN controller does not keep track of the group membership. In still other embodiments, the SDN controller keeps track of the group membership, but some LHRs inform the SDN controller of the group membership changes only when the group membership changes require modification of the multicast paths.

Tree Modification Initiated in IP Domain

Figure 15:
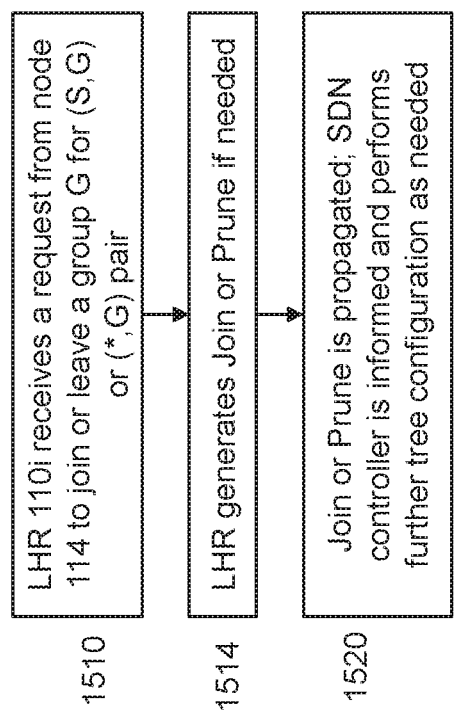

The tree modification process of FIG. 14 may be initiated by the FHR or LHR 110 located either within or without IP domain 104. However, in some embodiments, a different process is performed if the FHR or LHR is in IP domain 104, as shown in FIG. 15. In block 1510, a router 110i receives a request from node 114 to join or leave a multicast group G, or to switch a multicast tree. In block 1514, if the request from node 114 necessitates adding or pruning a multicast path, then the router 110i, acting as the LHR, generates a Join and/or Prune message to the router's RPF neighbor(s) per PIM-SM protocol. If an RPF neighbor is in IP domain 104, the Join or Prune is propagated by the upstream routers (block 1520) in IP domain 104 to reach an "end router", i.e. one of: a router 110i already having the corresponding (S,G) or (*,G) state; or the tree root 110i (if the root is in IP domain 104); or a gateway 110gw.

As the Join or Prune is propagated, each router modifying its MRIB 139 notifies the SDN controller 210, and/or the root, of the tree modification. Alternatively, the Join or Prune includes the J/P Path, and the J/P Path is sent to the SDN controller by the "end router" (i.e. the router 110i already having the (S,G) or (*,G) state; or the tree root 110i (if the root is in IP domain 104); or the gateway 110gw).

If the end router is a gateway 110gw, and the multicast path being added or deleted continues past the end router into SDN domain 1104, then the SDN controller determines if tree modifications are needed in SDN domain 1104 to accomplish the request from node 114. If so, the SDN controller sends requests to routers 110s as needed. Also, the SDN controller may re-calculate the tree (as in block 1414), and modify the tree (as in blocks 1420-1430).

As noted above, the tree modification may be initiated by anode 114 sourcing multicast traffic to a group G. In some embodiments, the node's FHR 110 informs the SDN controller, and the SDN controller executes the process of FIG. 14 to configure the path(s) from the FHR to the tree root and/or to the receivers as appropriate. Such process is performed regardless of whether or not the FHR is in IP domain 104.

Alternatively, in some embodiments, when the FHR is an IP domain router 110i, the FHR encapsulates the packets from source 114 and sends them to the RP per the PIM-SM register protocol. The encapsulated packets may reach the tree root (e.g. the RP) without leaving the IP domain 104 if the root is in the IP domain. Alternatively, the encapsulated packets may reach a gateway 110gw on the way to the root. In either case, the root 110i or the gateway 110gw informs the SDN controller 210 of receiving encapsulated packets and identifies the FHR (the FHR's IP address is the source IP address in the encapsulated packet). In response, the SDN controller may configure the tree per the process of FIG. 14. In block 1424, the "most downstream router" is the root 110i or the gateway 110gw that received the encapsulated packets. The root or gateway will receive, in block 1424, a Redirect request to send a Join to the FHR. The Redirect request may specify the entire path from the root or gateway to the FHR. SDN controller 210 may calculate the entire path from network topology DB 1210. Alternatively, the Redirect request may include an instruction to use RPF (the shortest path) for the Join.

If one variation, if the encapsulated packets reach the RP, the RP sends a Join toward the FHR per PIM-SM Register-Stop protocol without waiting for the SDN controller's Redirect request. In some embodiments, the SDN controller does not send the Redirect request if the encapsulated packets reach the RP.

Segment Routing

In some embodiments, segment routing is used in SDN domain 1104, and the segment routing interoperates with the IP domain 104. For example, in some embodiments, a unique flow SID (Segment ID) is assigned to each (S,G) or (*,G) flow. Segment IDs are described in RFC 8402, "Segment Routing Architecture", Internet Engineering Task Force (IETF), July 2018, incorporated herein by reference. The flow SID can be inserted in packets traveling in the SDN domain 1104, e.g. between the layer 2 and layer 3 headers for example, similarly to MPLS labels, or via insertion in the IP header (e.g. IPv6 header) as known in the art. The flow SID may be present in SDN domain 1104, but in some embodiments the flow SID is removed in IP domain 104 in order to minimize changes to existing IP domain operation. In particular, in some embodiments, when the packet is forwarded by gateway 110gw from SDN domain 1104 to IP domain 104, the gateway strips away the flow SID. When a gateway forwards the packet from IP domain 104 to SDN domain 1104, the gateway determines the flow SID and appends it to the packet. The flow SID is determined based on the packet's (S,G) or (*,G) flow as defined by the forwarding entry (Table 1) in the gateway's MRIB 139D (FIG. 4).

The flow SID can be generated, for example, by the SDN controller in block 1410: the SDN controller may check in block 1410 if the (S,G) or (*,G) pair in the request is already assigned a flow SID, and may generate the flow SID if no such assignment has been made. The flow SID may consist, for example, of: (a) the IP addresses of the group G, and (b) the IP address or the node ID of the corresponding root. The flow SID may include additional parameters, or may be of some other type.

Figure 16:
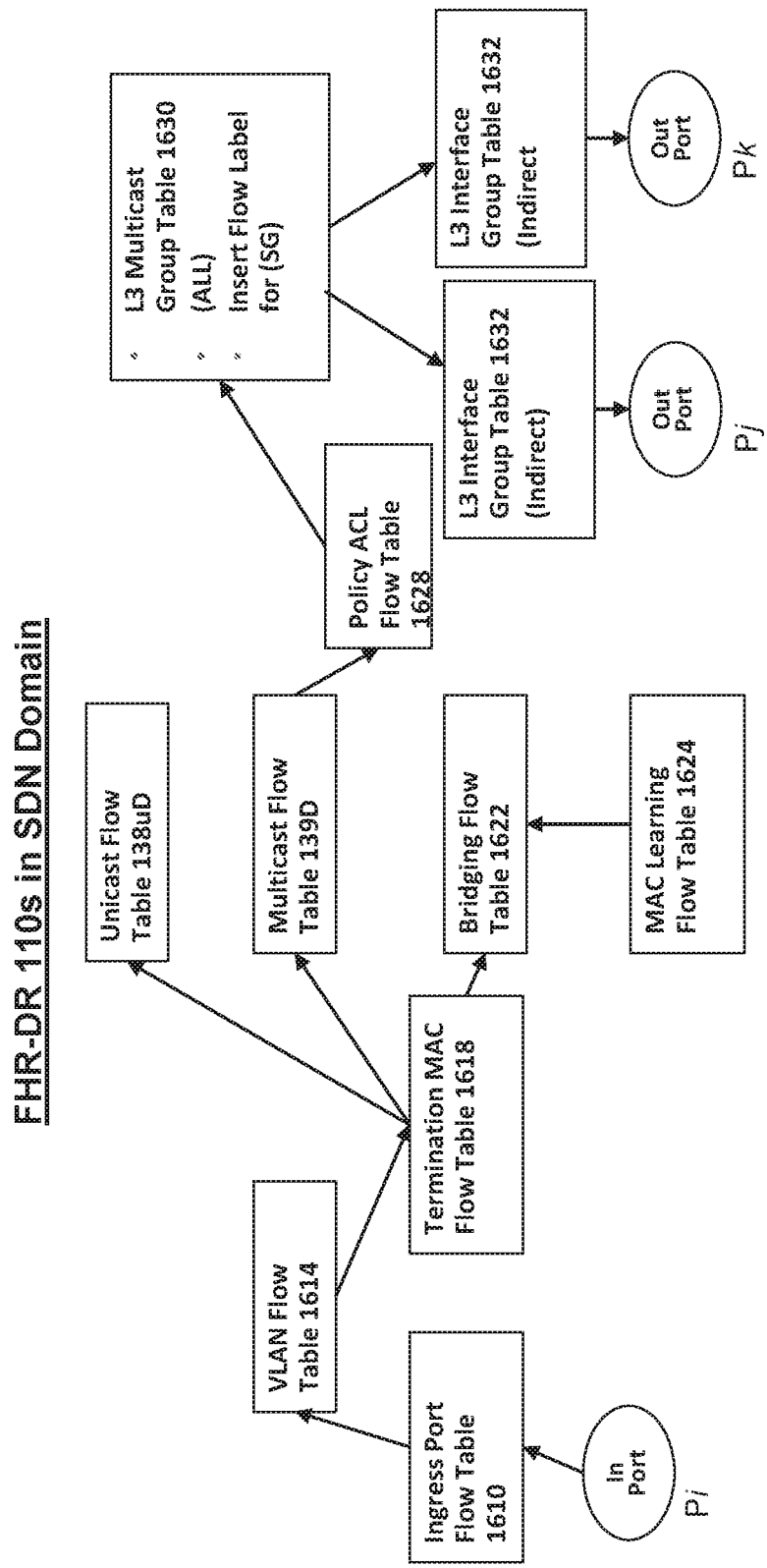
FIGS. 16 and 17 are block diagrams illustrating embodiments of network routers.

FIG. 16 illustrates processing blocks in an exemplary data plane of a designated router serving as an FHR in SDN domain 1104. The router may or may not be a gateway 110gw. The processing blocks are for SDN operation, to process a packet received on a port Pi from a node 114. The packet may be forwarded on ports Pj and Pk in this example. Some blocks are conventional in OpenFlow, including: Ingress Port Flow Table 1610, VLAN Flow Table 1614, Termination MAC Flow Table 1618, Unicast Flow Table 138uD (part of table 138D of FIG. 4; the FHR may have a data plane as in FIG. 4, but not a control plane), Multicast Flow Table 139D, Bridging Flow Table 1622, MAC Learning Flow Table 1624, Policy ACL Flow Table 1628. The flow SIDs may be added to L3 Multicast Group Table 1630. The router determines the flow SID of the packet from the packet's (S,G) or (*,G) parameter defined by matching the packet's destination address of group G with an entry (Table 1) in multicast flow table 139D. The flow SID is added to the packet per block 1630. Block 1630 determines, based on the flow SID, pointers to tables for the corresponding outgoing interfaces, e.g. interfaces Pj and Pk in the example of FIG. 16. The corresponding blocks 1632 provide further parameters for forwarding the packet on these interfaces.

Figure 17:
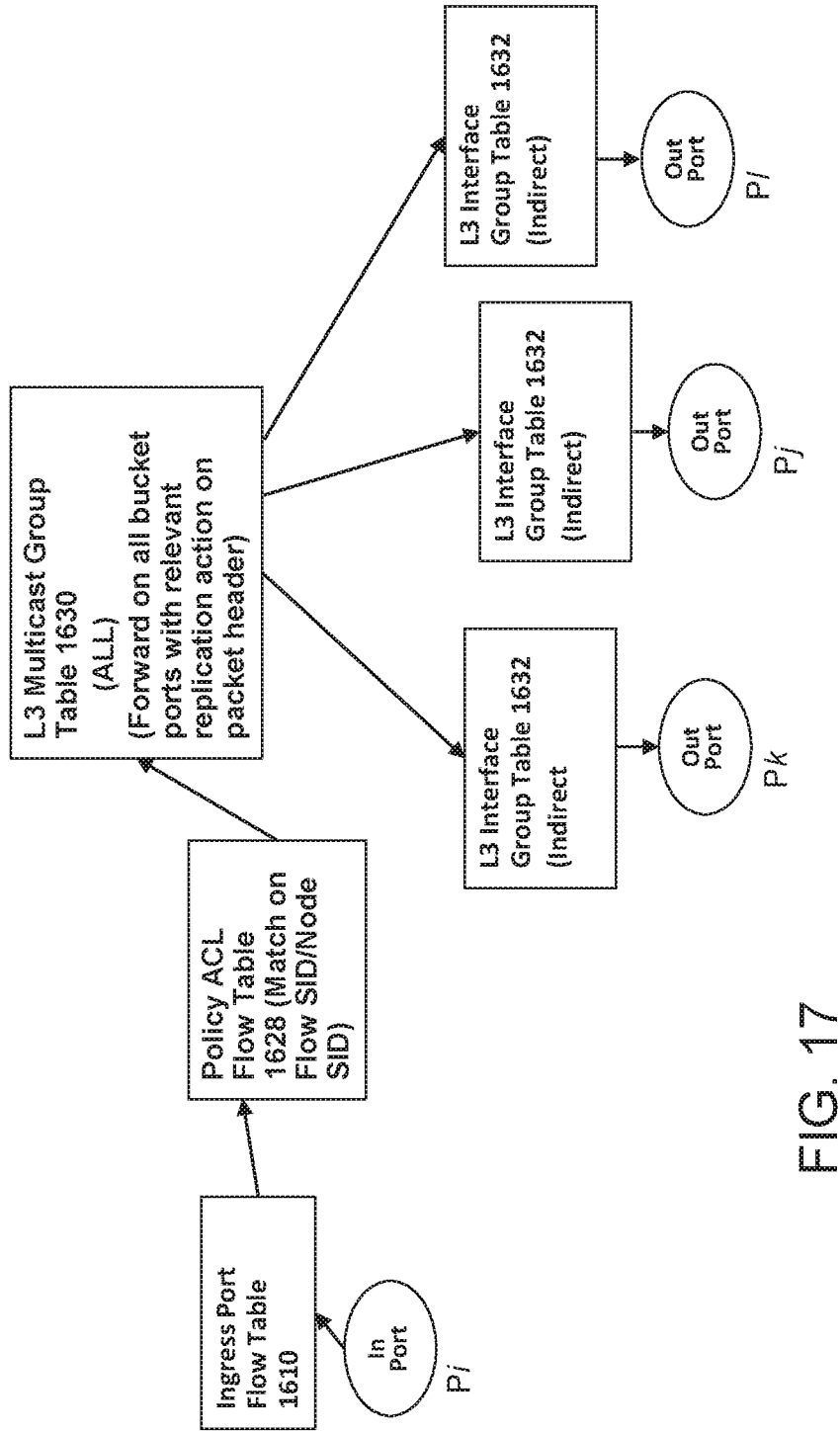

FIG. 17 illustrates processing blocks in an exemplary data plane of a router 110s other than a designated router. The router may or may not be the gateway 110gw. The tables are for the SDN operation, to process a packet received on a port Pi. The packet may be forwarded on ports Pj, Pk, and Pl in this example. Some blocks are conventional in OpenFlow, and are similar to blocks of FIG. 16, including Ingress Port Flow Table 1610. In Policy ACL Flow Table 1628, the match is made both based on the packet's flow SID, and on the node SID (global node ID) corresponding to the packet's source IP address. Flow SIDs may be part of L3 Multicast Group Table 1630. The router reads the packet's flow SID from the packet. Table 1630 determines, based on the flow SID, pointers to tables for the corresponding outgoing interfaces, e.g. interfaces Pj, Pk, and Pl in the example of FIG. 17. The corresponding tables 1632 provide further parameters for forwarding the packet on these interfaces.

Some embodiments use other kinds of segment routing in SDN domain 1104 and/or IP domain 104. For example, MPLS based segment routing can be used.

Some embodiments of the present invention are defined by the following clauses:

Clause 1. A method for operating a hybrid gateway which is part of a Software Defined Networking domain (SDN domain) controlled by an SDN controller, the hybrid gateway being also part of a non-SDN IP domain that comprises one or more non-SDN IP routers interconnected by one or more links, the method comprising:

participating, by the hybrid gateway, in a routing protocol executed in the non-SDN IP domain, to obtain topology information for the non-SDN IP domain, the topology information identifying one or more of the non-SDN IP routers and one or more of the links; and sending the topology information by the hybrid gateway to an SDN controller. (Of note, the network may include multiple SDN domains and/or multiple non-SDN domains. A multicast path may traverse multiple SDN domains and multiple non-SDN domains.)

2. The method of clause 1, further comprising sending, by the hybrid gateway, an IP address of the SDN controller to at least one non-SDN IP router.

3. The method of clause 1 or 2, further comprising sending, by the hybrid gateway, a broadcast or multicast message comprising an IP address of the SDN controller to the non-SDN IP domain.

4. The method of any preceding clause, further comprising sending, by the hybrid gateway, a message to at least one non-SDN router to inform the non-SDN router that the hybrid gateway is available to forward packets from the non-SDN router to the SDN controller.

5. The method of clause 4, wherein the message is broadcast or multicast to a plurality of the non-SDN routers.

7. A method for managing multicast transmissions by a Software Defined Networking controller (SDN controller), the method comprising:

obtaining, by the SDN controller of an SDN domain, a first request pertaining to multicast;

determining by the SDN controller, in response to the first request, a multicast topology modification to be performed in a non-SDN IP domain for the first request; and generating, by the SDN controller, a second request for a first router of the non-SDN IP domain to initiate the modification.

8. The method of clause 7 wherein the modification is to be performed upstream of the first router in a multicast path. (The term "multicast path" includes a complete path from a source to a destination of multicast traffic, or any part of the path.)

9. The method of clause 7 or 8 wherein the modification comprises creating a multicast path upstream of the first router.

10. The method of clause 9 wherein the second request specifies each router in the multicast path upstream of the first router.

11. The method of any one of clauses 7 through 10 wherein the modification also comprises deleting a multicast path upstream of the first router.

12. The method of any one of clauses 7 through 11 wherein the first request is in response to a network node requesting to join or leave a multicast tree.

13. The method of any one of clauses 7 through 11 wherein the first request is in response to a network node sending data to a multicast group.

14. The method of any one of clauses 7 through 13 further comprising:

determining by the SDN controller, in response to the first request, a multicast topology modification to be performed in the SDN domain for the first request; and sending by the SDN controller one or more requests to one or more routers in the SDN domain to implement the multicast topology modification in the SDN domain.

15. The method of clause 14 wherein the multicast topology modification in the SDN domain and the multicast topology modification in the non-SDN domain involve creating a multicast path present both in the SDN domain and in the non-SDN domain.

16. The method of clause 14 or 15 wherein the multicast topology modification in the SDN domain and the multicast topology modification in the non-SDN domain involve deleting a multicast path present both in the SDN domain and in the non-SDN domain.

17. A method for managing multicast transmissions by a Software Defined Network (SDN) controller, the method comprising:

maintaining, by the SDN controller, multicast topology information on one or more multicast distribution paths each of which is present in both an SDN domain controlled by the SDN controller, and in a non-SDN IP domain;

wherein said maintaining comprises receiving, by the SDN controller, the multicast topology information from at least one router in the non-SDN IP domain.

18. The method of clause 17 further comprising:

determining, by the SDN controller, that a negative condition exists in the one or more multicast distribution paths in the non-SDN IP domain, and determining a desired change of the one or more multicast distribution paths to relieve the negative condition; and generating by the SDN controller a Redirect request for a first downstream router which is part of at least one said path and of the non-SDN IP domain, and which is downstream of the desired change, the Redirect request requesting the first downstream router to initiate the desired change.

19. The method of clause 18 wherein the Redirect request is sent to a hybrid router for forwarding to the first downstream router, the hybrid router being part of the non-SDN IP domain and of the SDN domain.

20. The method of clause 18 or 19 wherein the Redirect request specifies each router in a new multicast path to be formed in the desired change.

The invention also includes computer systems, such as routers and SDN controllers, configured to implement the methods described above. The invention includes computer readable media having computer instructions which program computer processors to execute the methods described above.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method comprising managing multicast transmissions by a Software Defined Networking controller (SDN controller), the multicast transmissions being performed according to one or more multicast protocols which allow network nodes to join multicast groups while operating as network nodes, and allow network nodes to leave multicast groups while operating as network nodes, each multicast group being a group of receivers of a multicast transmission, the managing comprising:

obtaining, by the SDN controller of an SDN domain, a first request pertaining to multicast;

determining by the SDN controller, in response to the first request, a multicast topology modification to be performed in a non-SDN IP domain for the first request, the multicast topology modification requiring a reconfiguration of one or more routers with respect to one or more multicast paths, wherein each of the one or more routers is in the non-SDN IP domain but not in the SDN domain; and generating, by the SDN controller, a second request for a first router of the non-SDN IP domain to initiate the modification.

2. A Software Defined Network controller configured to perform the method of claim 1.

3. The method of claim 1 wherein the modification is to be performed upstream of the first router in at least one said multicast path, wherein initiating the modification comprises the first router sending a request to another router in the at least one said multicast path to reconfigure the other router for said modification.

4. A Software Defined Networking controller configured to perform the method of claim 1.

5. The method of claim 1 wherein the modification comprises creating at least one said multicast path upstream of the first router, wherein initiating the modification comprises the first router sending a request to another router in the at least one said multicast path to reconfigure the other router for said modification.

6. A Software Defined Network controller configured to perform the method of claim 5.

7. The method of claim 5 wherein the second request specifies each router in the at least one said multicast path upstream of the first router.

8. A Software Defined Network controller configured to perform the method of claim 7.

9. The method of claim 1 wherein the modification comprises deleting at least one said multicast path upstream of the first router, wherein initiating the modification comprises the first router sending a request to another router in the at least one said multicast path to reconfigure the other router for said modification.

10. A Software Defined Network controller configured to perform the method of claim 9.

11. The method of claim 4 wherein the first request is in response to a network node requesting to join or leave a multicast tree.

12. The method of claim 1 wherein the first request is in response to a network node sending data to a multicast group.

13. The method of claim 1 further comprising:

determining by the SDN controller, in response to the first request, a multicast topology modification to be performed in the SDN domain for the first request; and sending by the SDN controller one or more requests to one or more routers in the SDN domain to implement the multicast topology modification in the SDN domain.

14. The method of claim 13 wherein the multicast topology modification in the SDN domain and the multicast topology modification in the non-SDN domain involve creating at least one said multicast path present both in the SDN domain and in the non-SDN domain.

15. The method of claim 13 wherein the multicast topology modification in the SDN domain and the multicast topology modification in the non-SDN domain involve deleting at least one said multicast path present both in the SDN domain and in the non-SDN domain.

16. A method for managing multicast transmissions by a Software Defined Network (SDN) controller, the method comprising:

maintaining, by the SDN controller, multicast topology information on one or more multicast distribution paths each of which is present in both an SDN domain controlled by the SDN controller, and in a non-SDN IP domain, the one or more multicast distribution paths comprising one or more routers each of which is part of the non-SDN IP domain but is not part of the SDN domain, the multicast topology information describing a configuration of each said router with respect to the one or more multicast paths;

wherein said maintaining comprises receiving, by the SDN controller, the multicast topology information from at least one said router in the non-SDN IP domain; and wherein the method further comprises:

determining, by the SDN controller, that a negative condition exists in the one or more multicast distribution paths in the non-SDN IP domain, and determining a desired change of the one or more multicast distribution paths to relieve the negative condition; and generating by the SDN controller a Redirect request for a first downstream router which is part of at least one said path and of the non-SDN IP domain, and which is downstream of the desired change, the Redirect request requesting the first downstream router to initiate the desired change.

17. The method of claim 16 wherein the Redirect request is sent to a hybrid router for forwarding to the first downstream router, the hybrid router being part of the non-SDN IP domain and of the SDN domain.

18. The method of claim 16 wherein the Redirect request specifies each router in a new multicast path to be formed in the desired change.

19. A Software Defined Networking controller configured to perform the method of claim 16.

* * * * *

UNITED STATES PATENT AND TRADEMARK OFFICE
CERTIFICATE OF CORRECTION

PATENT NO. : 11,290,394 B2
APPLICATION NO. : 16/600335
DATED : March 29, 2022
INVENTOR(S) : Muthulakshmi Radhakrishnan Page 1 of 1

It is certified that error appears in the above-identified patent and that said Letters Patent is hereby corrected as shown below:

In the Claims

Column 22, Lines 25-26, Claim 2 should read:
--A Software Defined Networking controller configured to perform the method of claim 1.--;

Column 22, Lines 34-35, Claim 4 should read:
--A Software Defined Network controller configured to perform the method of claim 3.--;

Column 22, Lines 58-60, Claim 11 should read:
--The method of claim 1 wherein the first request is in response to a network node requesting to join or leave a multicast tree.--.

Signed and Sealed this
Nineteenth Day of July, 2022

Katherine Kelly Vidal
*Director of the United States Patent and Trademark Office*